US012680340B2

(12) United States Patent
Farag

(10) Patent No.: US 12,680,340 B2
(45) **Date of Patent: *Jul. 14, 2026**

(54) REKEYABLE LOCK WITH SMALL INCREMENTS

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,795

(22) Filed: Aug. 21, 2024

(65) Prior Publication Data

US 2025/0084668 A1 Mar. 13, 2025

Related U.S. Application Data

(63) Continuation of application No. 17/700,796, filed on Mar. 22, 2022, now Pat. No. 12,104,404, which is a continuation-in-part of application No. 16/527,188, filed on Jul. 31, 2019, now Pat. No. 11,572,708.

(60) Provisional application No. 63/165,456, filed on Mar. 24, 2021, provisional application No. 62/712,369, filed on Jul. 31, 2018.

(51) Int. Cl.
*E05B 27/00* (2006.01)

(52) U.S. Cl.
CPC ........ *E05B 27/005* (2013.01); *E05B 27/0082* (2013.01)

(58) Field of Classification Search
CPC .......................... E05B 27/005; E05B 27/0082
USPC .......................................................... 70/357
See application file for complete search history.

(56) References Cited

U.S. PATENT DOCUMENTS

| | | | | |
|---|---|---|---|---|
| 4,712,399 | A * | 12/1987 | Mattossovich | E05B 27/005 70/495 |
| 5,791,181 | A * | 8/1998 | Sperber | E05B 27/005 70/491 |
| 5,819,566 | A * | 10/1998 | Eden, Jr. | E05B 27/0078 70/358 |
| 6,860,131 | B2 * | 3/2005 | Armstrong | E05B 29/004 70/495 |
| 6,862,909 | B2 * | 3/2005 | Armstrong | E05B 27/005 70/495 |

(Continued)

FOREIGN PATENT DOCUMENTS

| | | |
|---|---|---|
| CN | 103114765 A | 5/2013 |
| CN | 105196530 A | 12/2015 |

(Continued)

OTHER PUBLICATIONS

Chinese language and English language translation of CN Office Action, including search report, dated Oct. 26, 2021, for CN patent application No. 201980057198.8 (15 pages).

(Continued)

*Primary Examiner* — Nathan Cumar
(74) *Attorney, Agent, or Firm* — Merchant & Gould P.C.

(57) ABSTRACT

A rekeyable lock cylinder with a cylinder body and a plug assembly. The lock cylinder includes a plurality of key followers and a corresponding plurality of racks disposed in the plug assembly. Disengaging the racks from the key followers allows rekeying of the lock cylinder.

20 Claims, 39 Drawing Sheets

(56) References Cited

U.S. PATENT DOCUMENTS 6,871,520 B2 * 3/2005 Armstrong ............ E05B 27/005 70/495
6,951,123 B2 * 10/2005 Chong .................. E05B 27/005 70/370
6,959,569 B2 * 11/2005 Strader ................. E05B 29/004 70/495
6,973,813 B2 * 12/2005 Erdely .................. E05B 29/004 70/377
7,007,528 B2 * 3/2006 Chong ................ E05B 29/0073 70/495
7,114,357 B2 * 10/2006 Armstrong .......... E05B 29/0066 70/495
7,117,701 B2 * 10/2006 Armstrong .......... E05B 29/0066 70/495
7,213,429 B2 * 5/2007 Armstrong ............ E05B 29/004 70/495
7,234,331 B2 * 6/2007 Armstrong ............ E05B 27/005 70/495
7,308,811 B2 * 12/2007 Armstrong ............ E05B 27/005 70/495
7,322,219 B2 * 1/2008 Armstrong .......... E05B 29/0066 70/495
7,434,431 B2 * 10/2008 Armstrong ............ E05B 29/004 70/495
7,448,239 B1 * 11/2008 Huang .................. E05B 27/005 70/495
7,448,240 B1 * 11/2008 Huang .................. E05B 29/004 70/495
7,565,825 B2 * 7/2009 Wheatland ............ E05B 27/005 70/495
7,634,931 B2 * 12/2009 Segien .................. E05B 27/005 70/378
7,836,739 B2 * 11/2010 Huang .................. E05B 27/005 70/495
7,878,036 B2 * 2/2011 Armstrong .......... E05B 63/0034 70/495
7,900,491 B2 * 3/2011 Chong .................. E05B 27/005 70/495
7,980,104 B1 7/2011 Huang
7,980,106 B2 7/2011 Huang et al.
8,033,150 B2 * 10/2011 Armstrong ............ E05B 27/005 70/495
8,056,378 B2 11/2011 Huang et al.
8,099,988 B1 * 1/2012 Wheatland ............ E05B 27/005 70/495
8,291,735 B1 * 10/2012 Damikolas ............ E05B 27/005 70/494
8,347,678 B2 * 1/2013 Chong .................... E05B 9/086 70/495
8,408,080 B2 * 4/2013 Damikolas ................ B07C 5/06 73/865.8
8,448,484 B2 * 5/2013 Huang .................. E05B 29/004 70/495
8,490,446 B2 * 7/2013 Rao ..................... E05B 29/0013 70/495
8,656,747 B2 * 2/2014 Armstrong ............ E05B 27/005 70/495
8,739,587 B2 * 6/2014 Chen ................... E05B 27/0082 70/495
8,881,567 B2 * 11/2014 Chong .................. E05B 29/004 29/804
RE45,627 E 7/2015 Chong et al.
9,127,479 B2 * 9/2015 Romero ................ E05B 27/005
9,359,791 B2 * 6/2016 Zhang ................... E05B 29/004
9,435,138 B2 * 9/2016 Walls .................. E05B 27/0057
9,657,499 B2 5/2017 Emory
9,988,828 B2 6/2018 Emory
10,024,079 B2 7/2018 Walls et al.
10,435,915 B2 * 10/2019 Zhang ................... E05B 27/005
10,612,271 B2 * 4/2020 Farag .................. E05B 27/0082
11,220,840 B1 * 1/2022 Farag .................... E05B 27/005
11,572,708 B2 * 2/2023 Farag .................. E05B 27/0082
12,104,404 B2 * 10/2024 Farag .................. E05B 27/0082
12,152,407 B2 11/2024 Farag
2003/0037582 A1 2/2003 Edwards, Jr. et al.
2005/0016234 A1 * 1/2005 Strader ................. E05B 29/004 70/492
2006/0101880 A1 * 5/2006 Ward-Dolkas ........ E05B 29/004 70/383
2008/0307841 A1 12/2008 Huang et al.
2008/0314106 A1 * 12/2008 Mathachan ........... E05B 27/005 70/493
2009/0031774 A1 * 2/2009 Armstrong .......... E05B 27/0082 70/491
2009/0078012 A1 3/2009 Huang et al.
2009/0277233 A1 11/2009 Huang et al.
2009/0277234 A1 * 11/2009 Huang .................. E05B 29/004 70/357
2009/0277239 A1 * 11/2009 Mathachan ......... E05B 27/0053 70/382
2010/0037666 A1 * 2/2010 Chong .................. E05B 27/005 70/357
2011/0041577 A1 * 2/2011 Zhang ................. E05B 29/0066 70/382
2011/0041579 A1 * 2/2011 Chen ................... E05B 27/0082 70/495
2012/0247163 A1 * 10/2012 Damikolas ............ E05B 27/001 70/492
2012/0304717 A1 * 12/2012 Loreti ................. E05B 29/0066 70/493
2013/0014548 A1 * 1/2013 Fan ....................... E05B 27/005 70/372
2013/0086957 A1 * 4/2013 Emory ................ E05B 29/0066 70/492
2013/0086958 A1 * 4/2013 Emory ................ E05B 29/0046 70/357
2014/0041429 A1 * 2/2014 Zhang ................... E05B 27/005 70/490
2014/0069156 A1 * 3/2014 Romero ................ E05B 27/005 70/385
2014/0223976 A1 * 8/2014 Chiou ................... E05B 27/005 70/490
2014/0250960 A1 * 9/2014 Li ......................... E05B 27/005 70/493
2016/0265249 A1 * 9/2016 Zhang ................... E05B 29/004
2016/0369527 A1 * 12/2016 Farag .................. E05B 27/0021
2020/0040605 A1 * 2/2020 Farag .................. E05B 27/0082
2020/0123806 A1 * 4/2020 Rufang ............... E05B 27/0082
2022/0213716 A1 * 7/2022 Farag .................. E05B 27/0082
2023/0102123 A1 * 3/2023 Farag .................. E05B 27/0082 70/384
2025/0084668 A1 * 3/2025 Farag .................. E05B 27/0082
2025/0101769 A1 3/2025 Farag

FOREIGN PATENT DOCUMENTS

JP 2011074613 A 4/2011
WO 2022/204154 A1 9/2022

OTHER PUBLICATIONS

International Search Report and Written Opinion for Application No. PCT/US2019/044352 mailed Oct. 9, 2019.
International Search Report and Written Opinion for Application No. PCT/US2022/021338 mailed Jun. 23, 2022.

* cited by examiner

REKEYABLE LOCK WITH SMALL INCREMENTS

CROSS-REFERENCE TO RELATED APPLICATIONS

The present application is a continuation of U.S. patent application Ser. No. 17/700,796, now U.S. Pat. No. 12,104, 404, filed Mar. 22, 2022, which claims priority to and the benefit of U.S. Provisional Patent Application No. 63/165, 456, filed on Mar. 24, 2021.

U.S. patent application Ser. No. 17/700,796, filed Mar. 22, 2022, is also a continuation-in-part of U.S. patent application Ser. No. 16/527,188, now U.S. Pat. No. 11,572,708, filed on Jul. 31, 2019, which claims priority to and the benefit of U.S. Provisional Application No. 62/712,369, filed on Jul. 31, 2018.

To the extent appropriate a claim for priority is made to each of the above listed applications. Additionally, the disclosure of each of the above listed applications is hereby incorporated by reference herein in their entireties.

BACKGROUND

Lock cylinders that can be rekeyed without removal of the cylinder plug are known. These types of locks are highly beneficial to consumers because the locks can be easily rekeyed without calling a locksmith. Sizes and tolerances of engaging components within the lock become smaller to allow an increased variation in the bitting of keys. This also creates an increase in stress on the small components. Therefore, there is a need for a rekeyable lock that increases the variation in the bitting of keys recognized by the lock while maximizing strength of the small components.

SUMMARY

This disclosure relates generally to locks; in particular, this disclosure relates to a lock with a rekeyable lock cylinder. According to one aspect of the present disclosure, a rekeyable lock cylinder is provided that maximizes a number of bitting positions for use in unlocking the lock cylinder. By maximizing a number of bitting positions, for example seven or more bitting positions, the number of bitting combinations of a key used with the lock cylinder is increased. This maximizes security of the lock cylinder.

According to one aspect, this disclosure provides a rekeyable lock cylinder with a cylinder body and a plug assembly disposed in the cylinder body. The cylinder body has a longitudinal axis and is formed to define a groove. The plug assembly is rotatable about the longitudinal axis. The rekeyable lock cylinder includes a locking bar movable between a locked position and an unlocked position. When in the locked position, the locking bar is positioned within the groove of the cylinder body to block rotation of the plug assembly with respect to the cylinder body. When in the unlocked position, the locking bar is spaced apart from the groove of the cylinder body to allow rotation of the plug assembly with respect to the cylinder body The rekeyable lock cylinder includes a key follower disposed in the plug assembly. The key follower includes a rack engagement feature that is a post. The rekeyable lock cylinder includes a rack disposed in the plug assembly. The rack includes a key follower engagement feature that is a slot. The rack engagement feature of the key follower and the key follower engagement feature of the rack are engaged to facilitate simultaneous movement of the key follower and the rack. The rack controls movement of the locking bar between the locked and unlocked positions. The rack is selectively disengageable from the key follower when moving in a direction parallel to the longitudinal axis of the plug assembly. The rekeyable lock cylinder includes the slot of the rack extending at least partially through, and bounded by, the rack. The slot has a first side and a second side that extend parallel with one another along a portion of the length of the rack. The slot has a series of engagement grooves that are arranged along the first side of the slot. The slot also includes a linear aperture arranged along the second side of the slot, immediately adjacent the series of engagement grooves. The post of the key follower has a projection that is engageable with at least one of the series of engagement grooves of the slot when the post is received in the slot. The post of the key follower includes a fin engageable with the linear aperture of the slot when the post is received in the slot.

According to another aspect, this disclosure provides a rekeyable lock cylinder with a cylinder body and a plug assembly disposed in the cylinder body. The cylinder body has a longitudinal axis and is formed to define a groove. The plug assembly is rotatable about the longitudinal axis. The plug includes a plurality of key follower recesses aligned along the longitudinal axis. The plurality of key follower recesses of the plug assembly each have a rectangular cross-section. The rekeyable lock cylinder includes a plurality of key followers that each have a portion positioned within each of the plurality of key follower recesses of the plug assembly. Each of the plurality of key followers corresponds with a rack and each rack is selectively disengageable from the corresponding key follower to facilitate rekeying between different keys. The portion of each of plurality of key followers positioned within each of the plurality of key follower recesses has a rectangular cross-section. The rekeyable lock cylinder includes a locking bar movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. Each rack controls movement of the locking bar between the locked and unlocked positions. Each of the plurality of key followers is formed to define a post. Each rack is formed to include a slot that extends at least partially through and bounded by the rack. The post is received in the slot such that complementary engagement surfaces of the post and slot engage with one another to block movement of the plurality key followers relative to the racks.

According to another aspect, this disclosure provides a rekeyable lock cylinder with a cylinder body and a plug assembly disposed in the cylinder body. The cylinder body has a longitudinal axis and is formed to define a groove. The plug assembly is rotatable about the longitudinal axis. The rekeyable lock cylinder includes a key follower and a corresponding rack disposed in the plug assembly. The rack is selectively disengageable from the key follower to facilitate rekeying between different keys. The key follower is formed to define a post having a first projection and a second projection. The first and second projections are vertically aligned within one another and perpendicular to the longitudinal axis of the cylinder body. The first and the second projections have a first length and a second length, respectively. The first and second lengths are parallel to the longitudinal axis of the cylinder body. The first length is greater than the second length. The rekeyable lock cylinder includes a locking bar movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The rack has a plurality of key follower post recesses. The post of the key follower is received in a pair of the plurality of key follower post recesses of the rack to block movement of the key follower relative to the rack.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
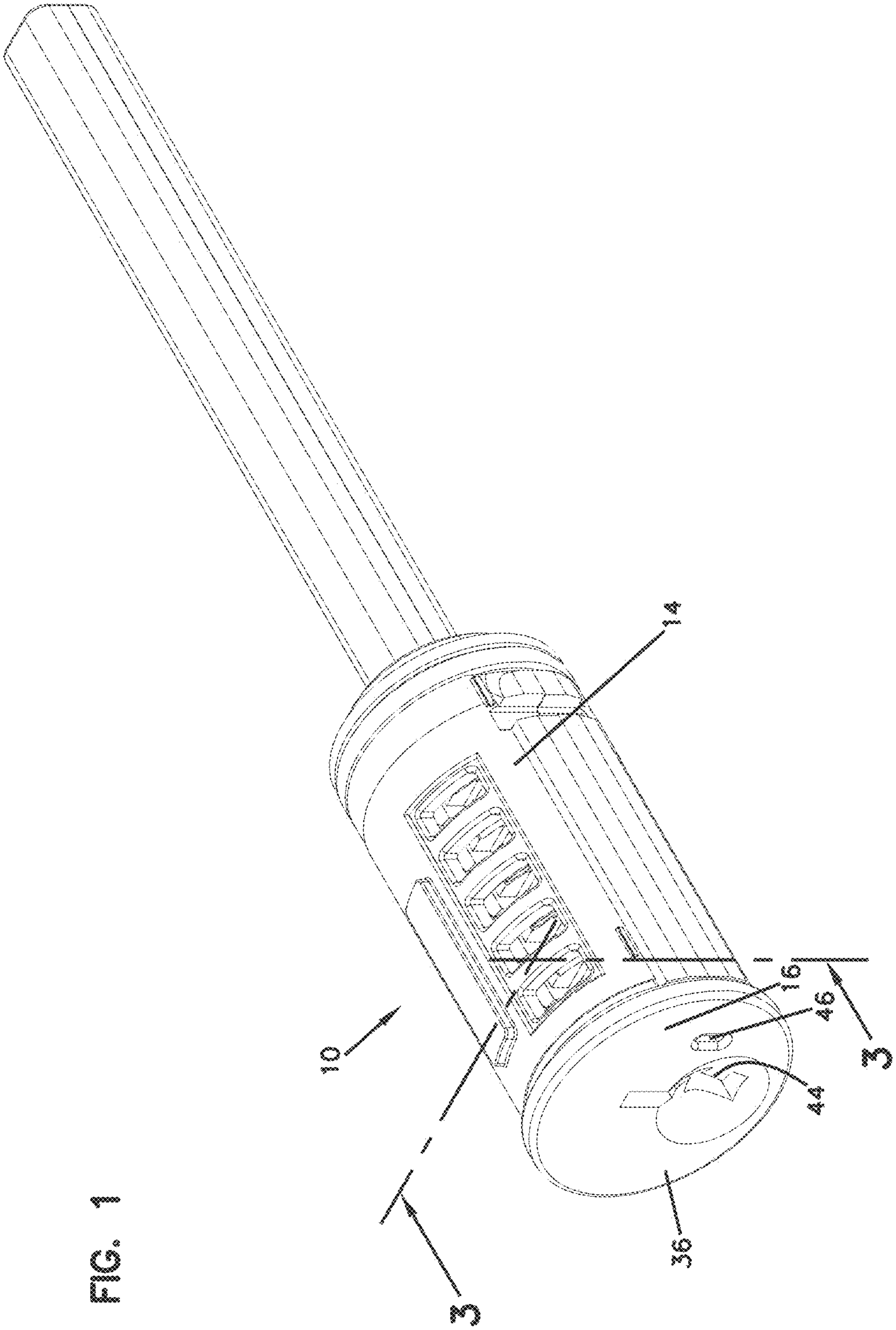
FIG. 1 is a perspective view of an example lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

This disclosure relates to a rekeyable lock cylinder that can be rekeyed without removal of the cylinder plug. The operation for rekeying the lock cylinder is similar to that described in U.S. Pat. No. 10,612,271, which is hereby incorporated by reference. While the rekeying operation operates similarly, the present lock cylinder includes pin-rack engagement features that maximize a number of bitting positions in the lock while maintaining strength. Examples of a rekeyable lock cylinder and methods of manufacturing of the same are described in U.S. Provisional Patent Application No. 63/165,517, filed on Mar. 24, 2021, entitled "DRILL RESISTANT LOCK CYLINDER AND METHOD OF MANUFACTURING", the disclosure of which is hereby incorporated by reference in its entirety.

Figure 2:
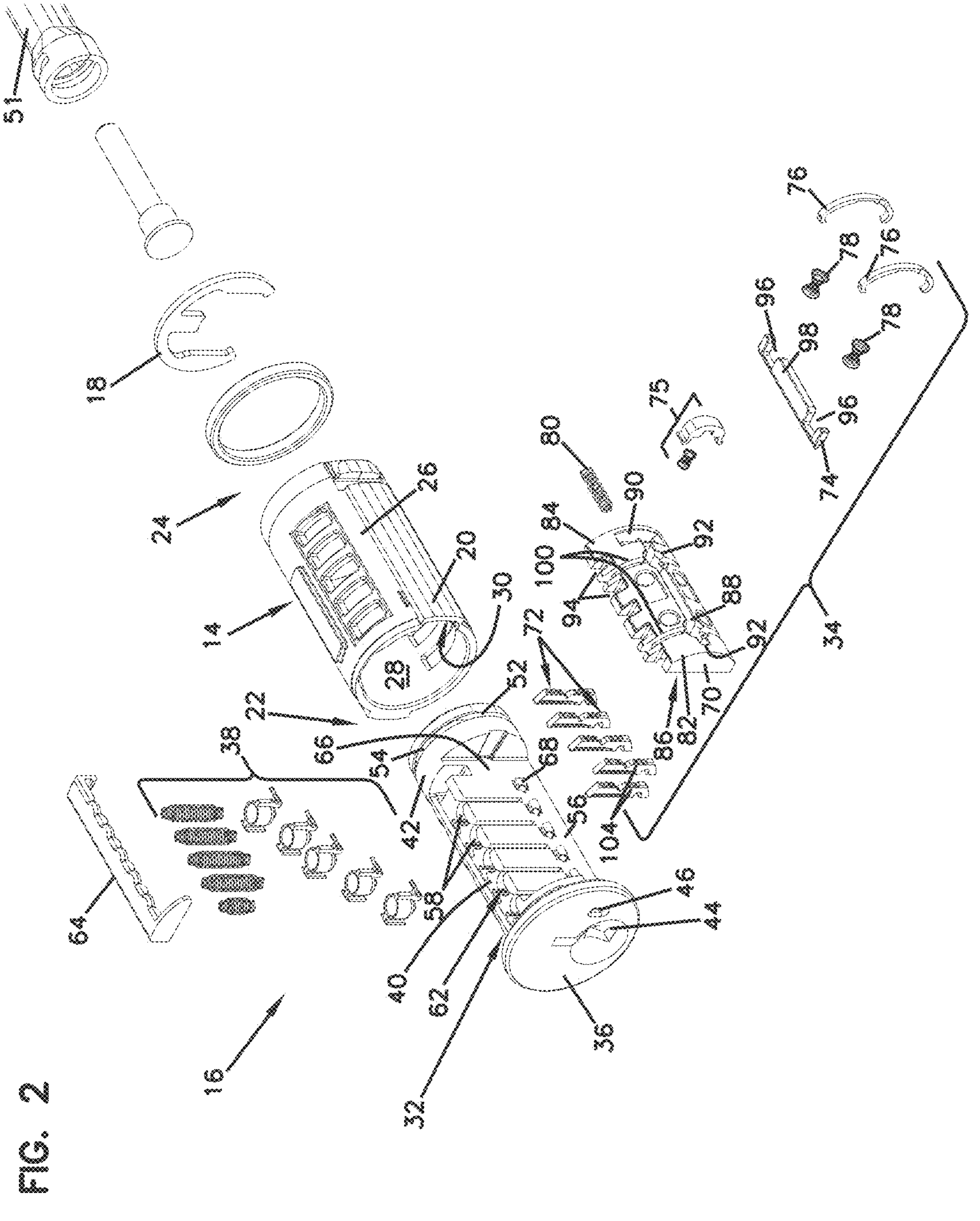
FIG. 2 is an exploded view of the example lock cylinder shown in FIG. 1.

An illustrative lock cylinder 10, according to an embodiment of the present disclosure, is illustrated in FIGS. 1 and 2. The lock cylinder 10 includes a cylinder body 14 and a plug assembly 16. A retainer clip 18 (FIG. 2) couples together the cylinder body 14 with the plug assembly 16.

The cylinder body 14, as best seen in FIG. 2, illustratively includes a generally cylindrical body 20 having a front end 22, a back end 24, and a cylinder wall 26 defining an interior surface 28. The cylinder wall 26 includes an interior, locking bar engaging groove 30 (best seen in FIGS. 3, 13, and 14). In some examples, the locking bar engaging groove 30 has a generally rectangular-shaped cross-section and extends longitudinally along a portion of the cylinder body 14, typically from the front end 22.

The plug assembly 16 includes a plug body 32, a carrier subassembly 34, and a plurality of key followers 38 (also known as pins). The plug body 32 illustratively includes a plug face 36, an intermediate portion 40, and a drive portion 42. The plug face 36 defines a keyway opening 44 and a rekeying tool opening 46. In some examples, the plug face 36 further defines a pair of channels extending radially outwardly for receiving anti-drilling ball bearings. The drive portion 42 is configured to drive a torque blade 51, which could be coupled with a latch assembly (not shown). The drive portion 42 further includes a pair of slots 52 formed in its perimeter and a central groove 54 for receiving the retainer clip 18 to retain the plug body 32 in the cylinder body 14.

The intermediate portion 40 includes a main portion 56 formed as a cylinder section and having a plurality of channels 58 for receiving the key followers 38. The channels 58 illustratively extend transversely to the longitudinal axis of the plug body 32. A retaining cap 64 is received in a recess 62 to trap the key followers 38 inside the plug body 32. The channels 58 extend partially through the plug body 32, with the sidewalls of the channels open to a planar surface 66. The planar surface 66 illustratively includes a plurality of bullet-shaped, rack-engaging features 68 that block rekeying of the lock cylinder 10 if racks 72 are not aligned to unlock the lock cylinder 10 (e.g., if a valid key is not inserted into the lock cylinder 10).

The carrier subassembly 34 includes a carrier 70, a plurality of racks 72, a spring catch 75, a locking bar 74, a pair of clips 76 for holding corresponding biasing members 78 against the locking bar 74 to urge the locking bar 74 against the racks 72, and a return spring 80. The carrier 70 includes a body 82 in the form of a cylinder section that is complementary to the main portion 56 of the plug body 32, such that the carrier 70 and the main portion 56 combine to form a cylinder that fits inside the cylinder body 14. The carrier 70 includes a curved surface 84 and a flat surface 86. The curved surface 84 includes a locking bar slot 88, a spring catch recess 90, and a pair of clip receiving recesses 100 for receiving the clips 76. The locking bar slot 88 illustratively includes a pair of biasing member-receiving bores 92 for receiving the biasing members 78. In the embodiment shown, the locking bar 74 includes a corresponding pair of recessed areas 96 for receiving the biasing members 78. The flat surface 86 of the carrier 70 includes a plurality of parallel rack-receiving slots 94 extending perpendicular to a longitudinal axis of the carrier 70.

Figure 3:
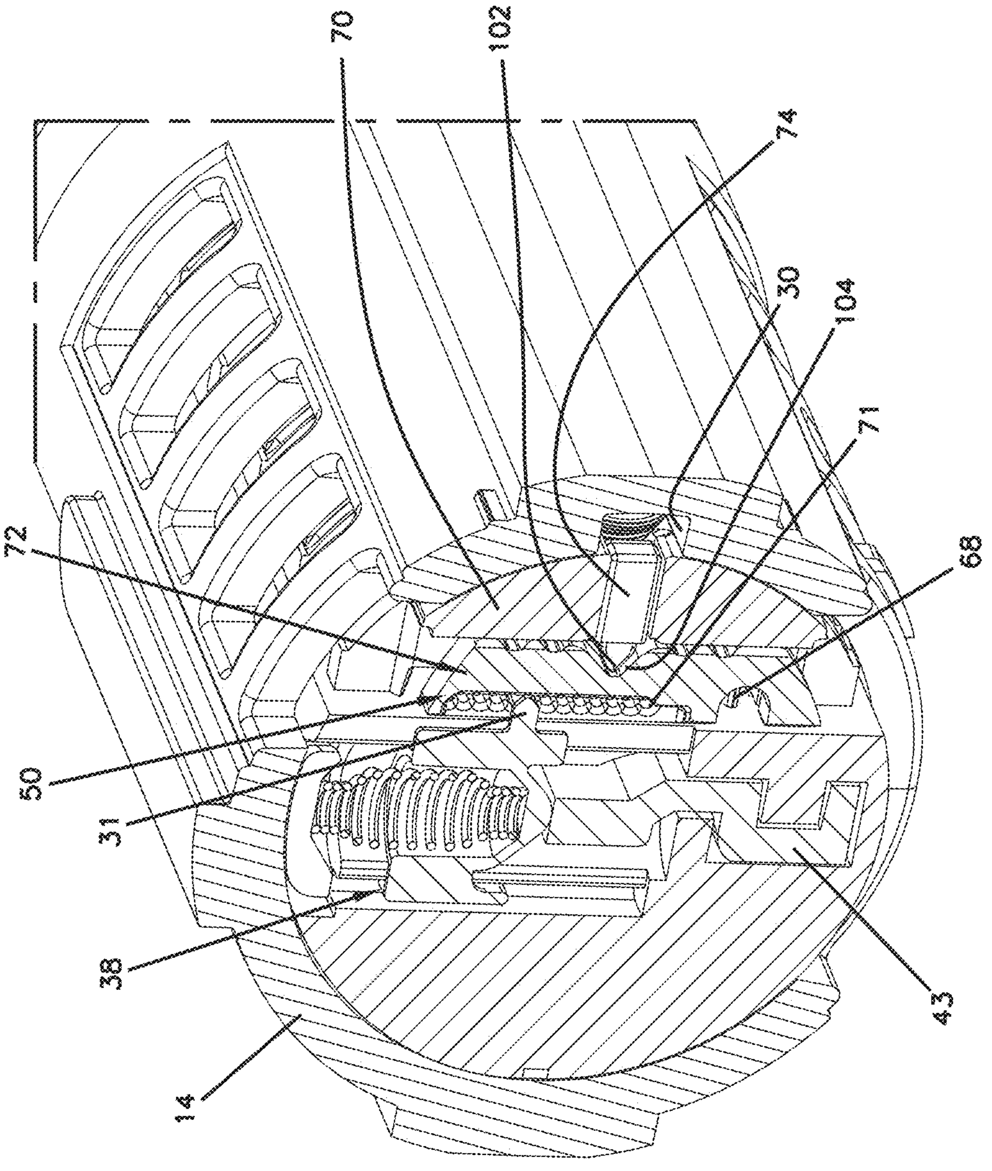
FIG. 3 is a perspective cross-sectional view along line 3-3 of FIG. 1 showing, among other things, the key followers engaged with the racks.
Figure 13:
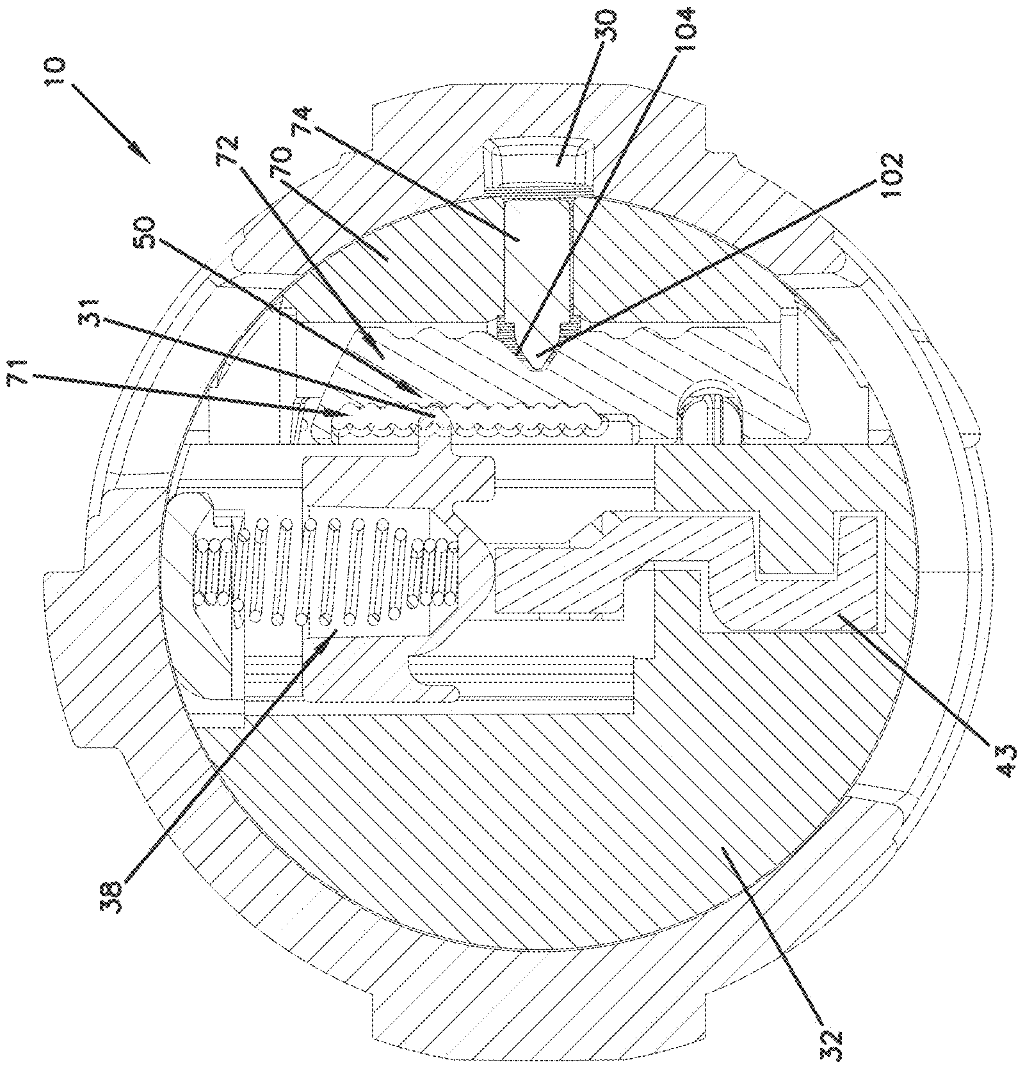
FIG. 13 is a cross-sectional view of the example lock cylinder shown in FIG. 1 showing the locking bar engaged with the rack in a first unlocking position.
Figure 14:
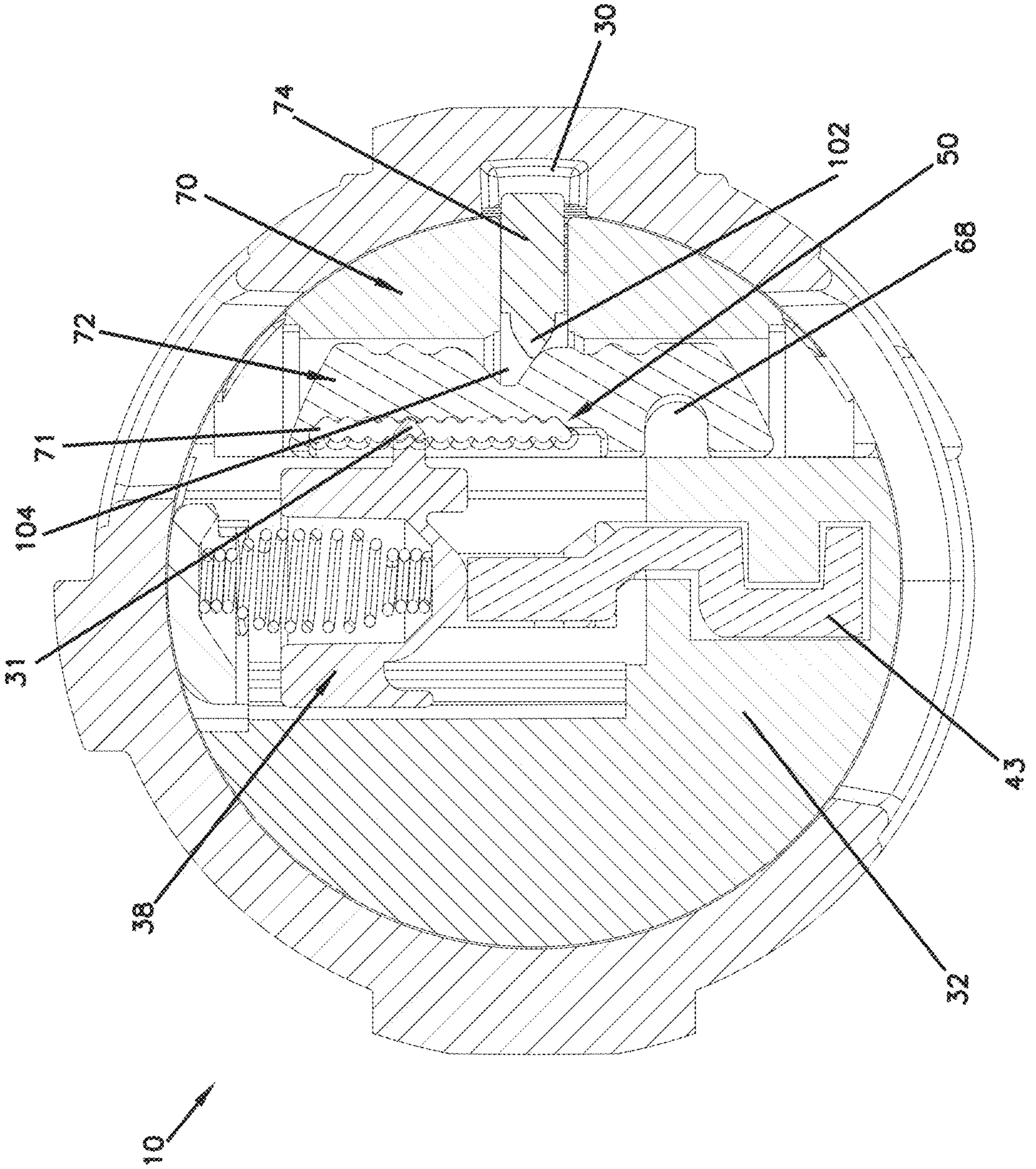
FIG. 14 is a cross-sectional view of the example lock cylinder shown in FIG. 1 showing the locking bar engaged with the rack in a first locked position.

The spring-loaded locking bar 74 is sized and configured to fit in the locking bar slot 88 in the carrier 70. The locking bar 74 illustratively includes a blocking portion 98 that is received in the locking bar engaging groove 30 in the cylinder body 14 when in a locked position (as shown in FIG. 14) and extends out of the locking bar engaging groove 30 when in an unlocked position (FIGS. 3 and 13). Opposite the squared-off edge of the blocking portion 98, the locking bar 74 includes a flange 102 configured to engage locking bar engaging grooves 104 formed in the racks 72 (FIG. 13). In the depicted examples, the flange 102 is generally triangular shaped and sized so that when the locking bar 74 is in the unlocked position, the flange 102 is positioned entirely within the locking bar engaging grooves 104 of the racks 72. As such, in some examples, the locking bar engaging grooves 104 of the racks 72 are larger than the flange 102. Biasing members 78 urge the blocking portion 98 out of the groove 30 in the cylinder body 14 toward the racks 72.

Figure 4:
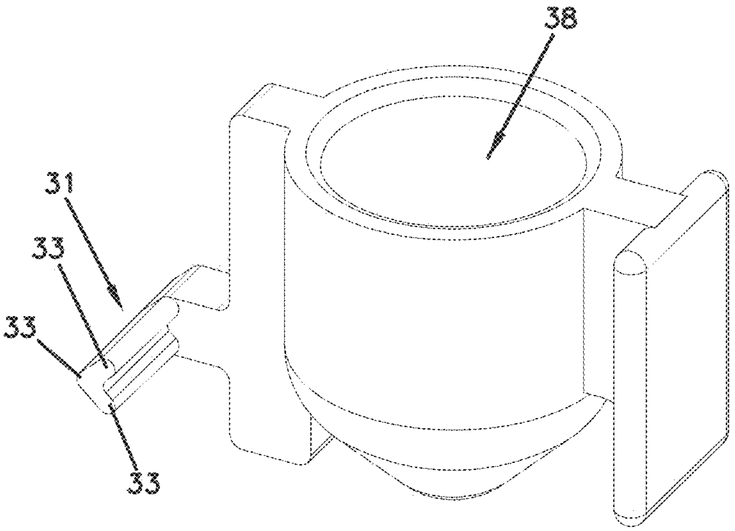
FIG. 4 is a perspective view of an example of a key follower according to an embodiment of this disclosure.
Figure 5:
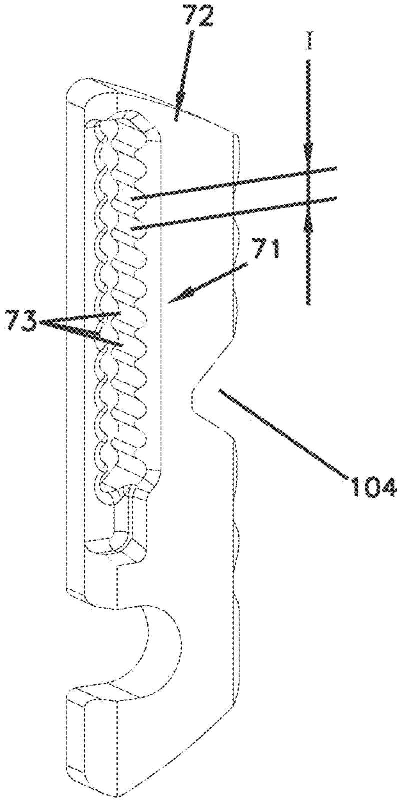
FIG. 5 is a perspective view of an example rack according to an embodiment of this disclosure associated with the example key follower shown in FIG. 4.

A pin-rack engagement feature 50 provides strong engagement between the key followers 38 and the rack 72 while allowing a plurality of bitting positions. One example of a pin-rack engagement feature 50, according to an embodiment of the present disclosure, is shown in FIGS. 3, 4, and 5. The pin-rack engagement feature 50 includes a rack engagement feature of the key follower 38 that is configured to engage with a key follower engagement feature of the rack 72. In the depicted example, the rack engagement feature is a post 31 and the key follower engagement feature is a slot 71. Complementary engagement surfaces of the post 31 and slot 71 engage with one another to block movement of the key followers relative to the racks 72. In some examples, the slot 71 provides engagement support around the post 31, specifically on opposing sides of the post 31.

Reducing size allows the lock to distinguish between additional bitting positions to increase the number of possible bitting sequences or patterns on keys used in lock cylinder 10 compared to the rekeyable lock cylinder described in U.S. Pat. No. 10,612,271, which increases security. The term “bitting position” is intended to mean a depth of a key cut in a bitting sequence of a key. The “bitting position” is typically identified by a digit or letter that indicates a depth of a key cut. The number of bitting positions (i.e., depths of key cuts) that can be recognized by lock cylinders differ. For example, the lock cylinder described in U.S. Pat. No. 10,612,271 is capable of recognizing six different bitting positions. This can be seen by the six gear teeth grooves in the racks illustratively shown in that application that receive the tooth of the key followers, which allows six positions of the key followers relative to the racks. The six positions of the racks relative to the key followers correspond with six bitting positions available for the lock cylinder illustratively described in that application. Due to tolerances in machining and structural rigidity of the racks, it is not feasible to increase the number of gear teeth in the racks to increase the number of bitting positions that are recognized by the lock cylinder described in that application.

The pin-rack engagement feature 50, illustratively described herein, increases the number of bitting positions recognized by the lock cylinder 10. In the depicted example, there are twelve grooves 73 available in the racks 72 that can be engaged by the post 31 of the key followers 38. Each consecutive groove 73 is spaced from one another by an increment distance I (as shown in FIG. 5), which is equal to the incremental distance separating each consecutive bitting position on a key. Accordingly, there are twelve bitting positions recognized by the lock cylinder 10 in the embodiment shown. Of course, one skilled in the art should appreciate that the lock cylinder 10 is shown for illustrative purposes, and could potentially include more or less grooves 73 to adjust the number of bitting positions recognized by the lock cylinder 10. By increasing the possible bitting positions available, such as seven or more for example, this increases the number of possible combinations for the bitting sequences to unlock the lock cylinder 10, thereby increasing security.

In the illustrative embodiment, as shown in FIG. 4, the post 31 includes three offset barrels 33 arranged in a triangular pattern. In some examples, each post 31 includes two offset barrels 33 arranged in a linear pattern. In some examples, each post 31 can have barrels 33 arranged in multiple linear patterns. For example, the linear patterns of the barrels 33 can be offset from one another by a half of a key cut increment to increase engagement with the rack 72. Each barrel 33 defines a semi-cylindrical outer surface. In some examples, cones are arranged at the ends of barrels 33 to guide insertion of the post 31 into the slot 71.

Figure 6:
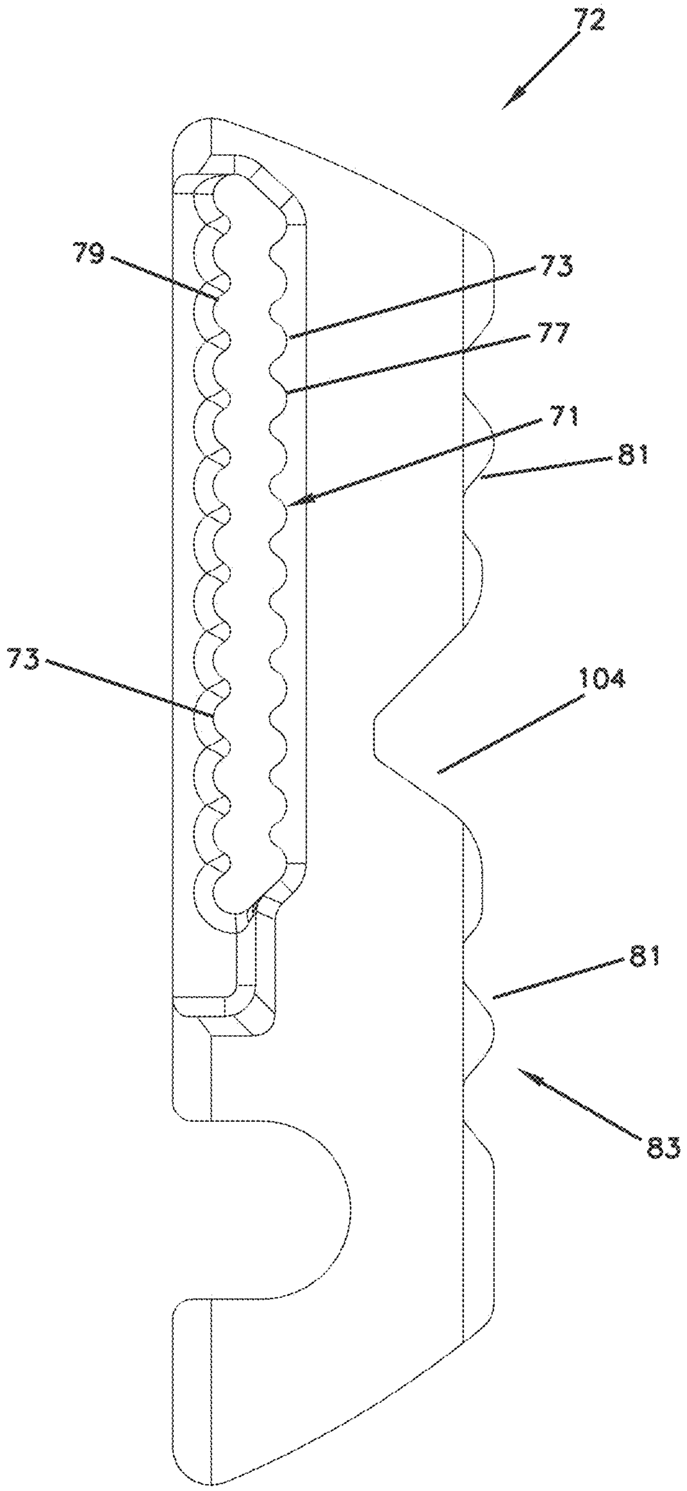
FIG. 6 is a front view of the rack of FIG. 5.
Figure 7:
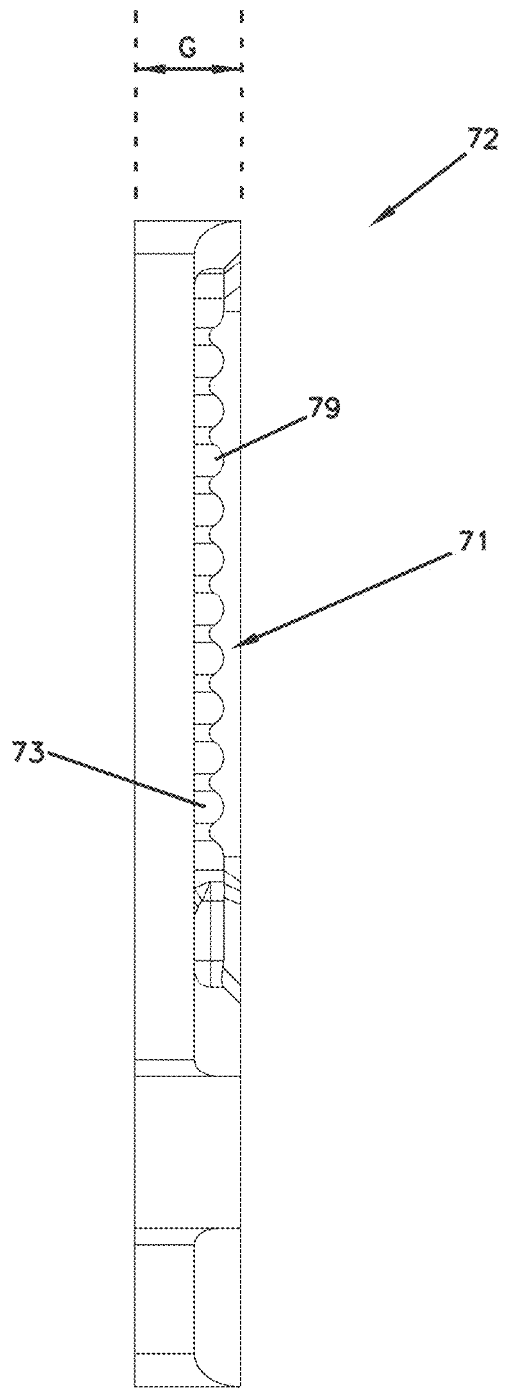
FIG. 7 is a side view of the rack of FIG. 5.
Figure 8:
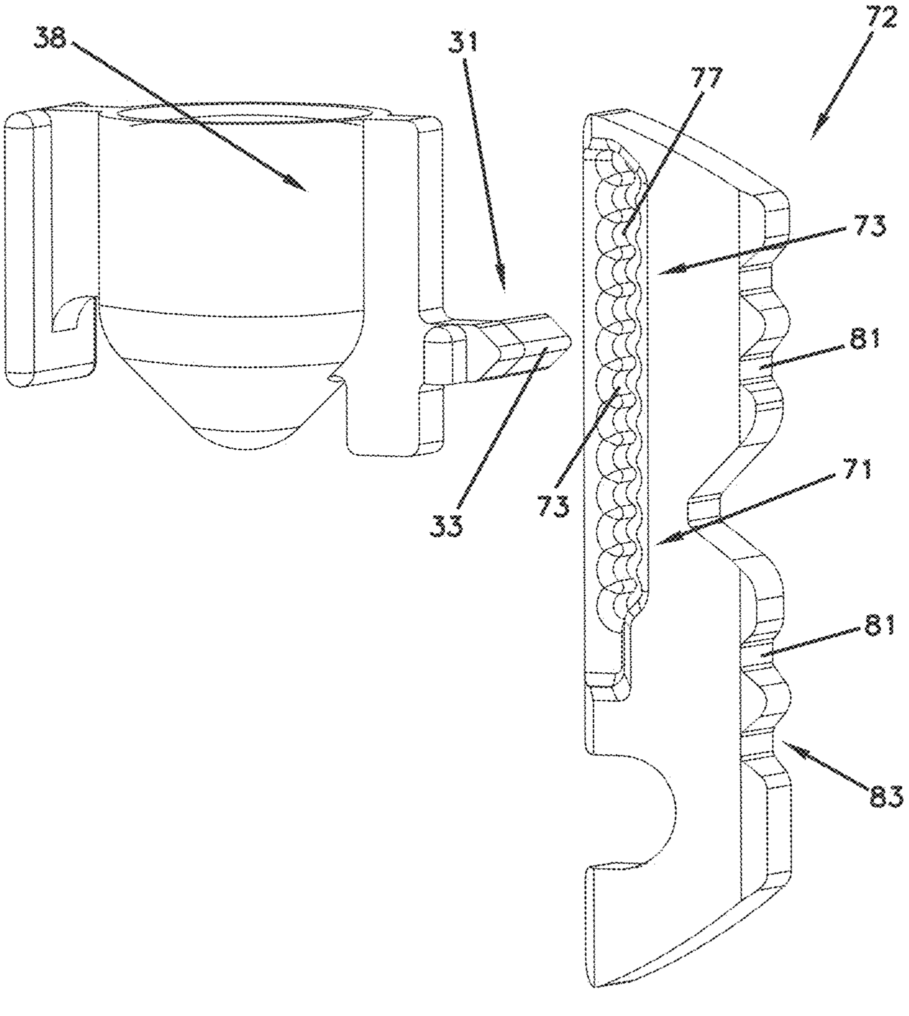
FIGS. 8-11 are perspective views of the key follower of FIG. 4 and rack of FIG. 4 mating.
Figure 9:
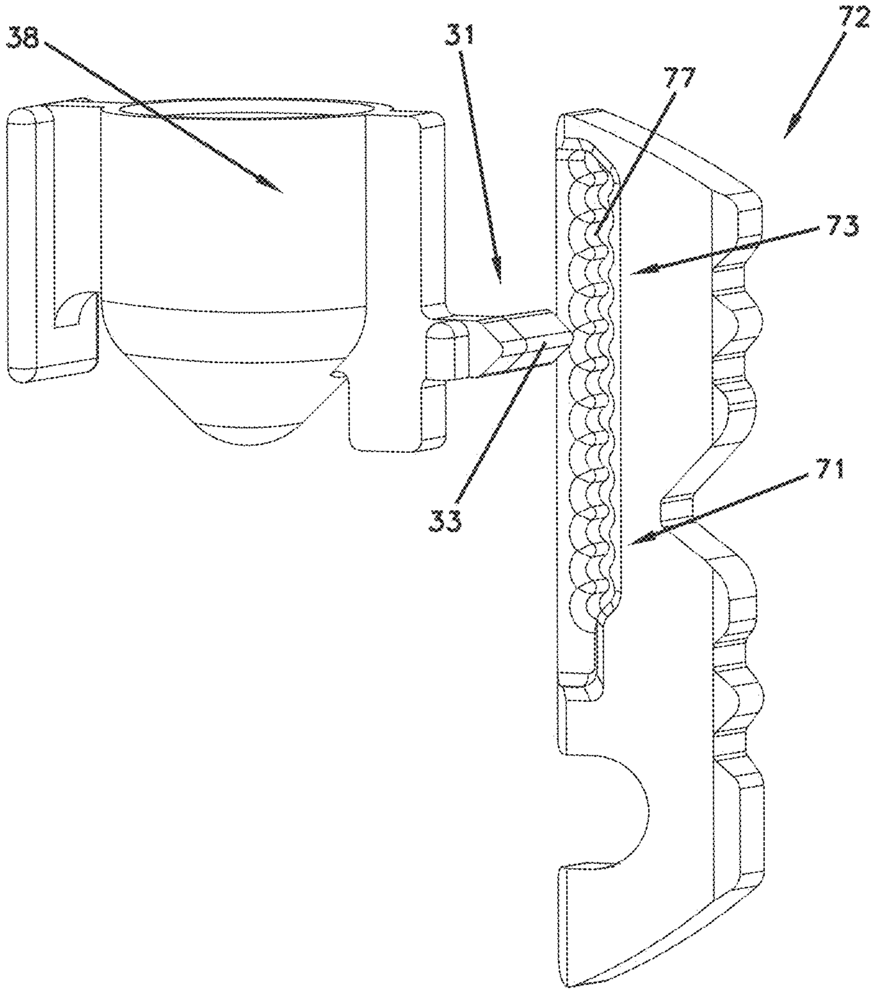
Figure 10:
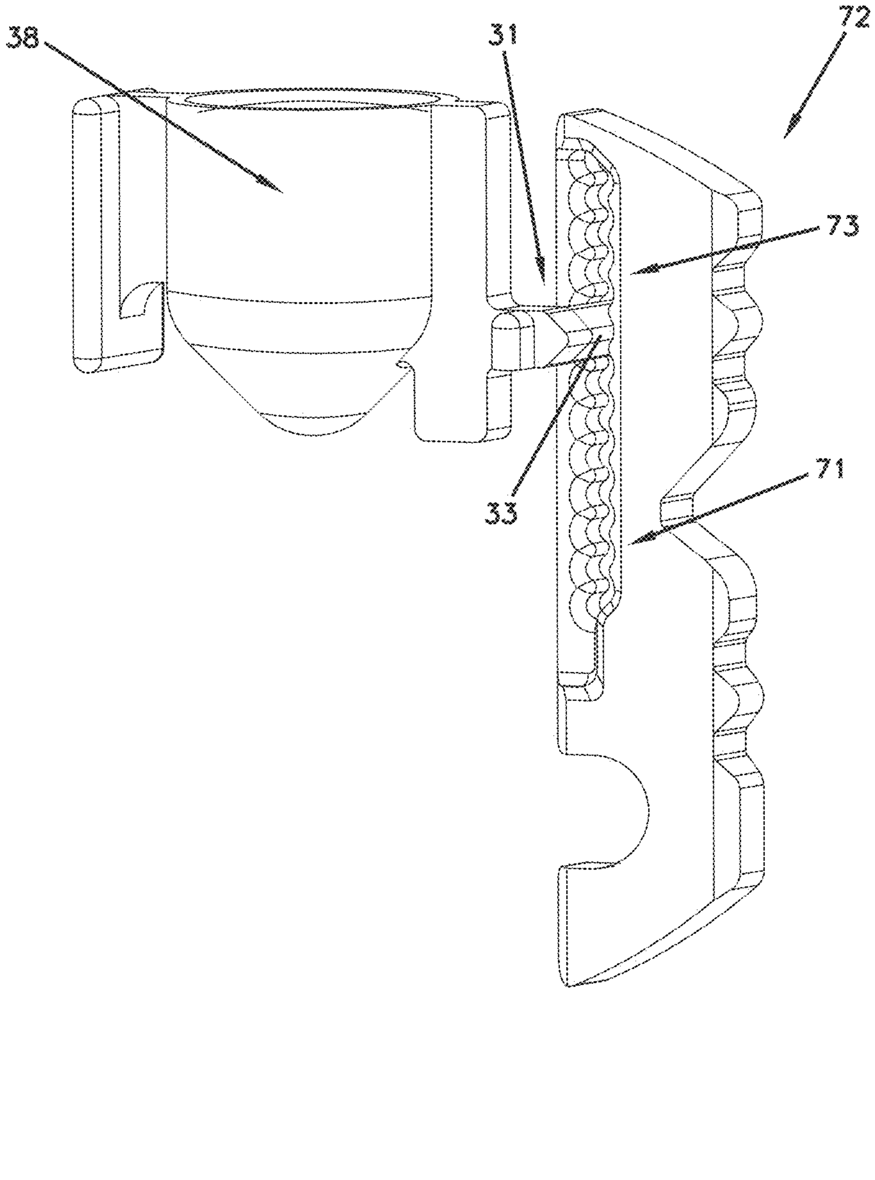
Figure 11:
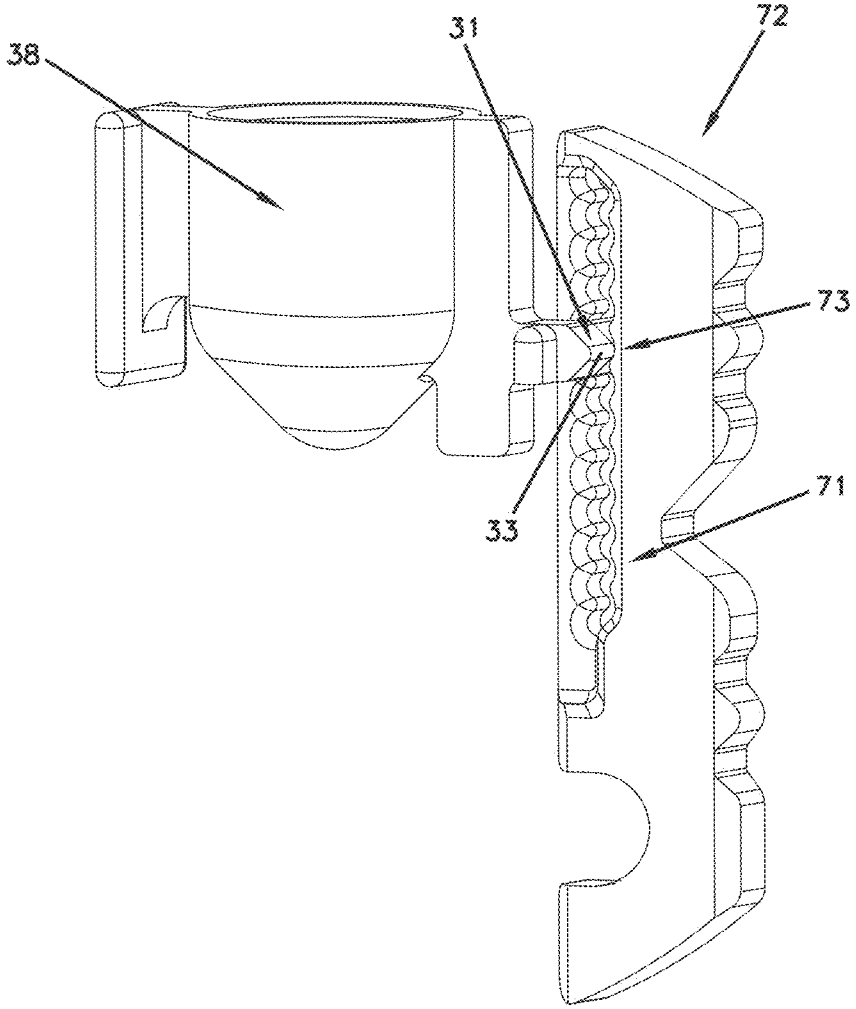

As seen in FIGS. 5-7, the slot 71 includes a series of semi-cylindrical grooves 73. A series of grooves 73 extends along either side of the slot 71 and are offset from one another to correspond to the pattern of barrels 33. The grooves 73 of each rack 72 include a first set of grooves 77, positioned closest to the key followers 38, and a second set of grooves 79 opposite from the first set of grooves 77 in the slot 71. In some examples, as shown in FIG. 7, the second set of grooves 79 can have a length G that is greater than a comparable length of the first set of grooves 77. In the illustrative embodiment, the slot 71 extends through and is bounded on all sides by the rack 72, as shown in FIG. 5. In some examples, the slot 71 does not extend through the entire rack 72.

Figure 12:
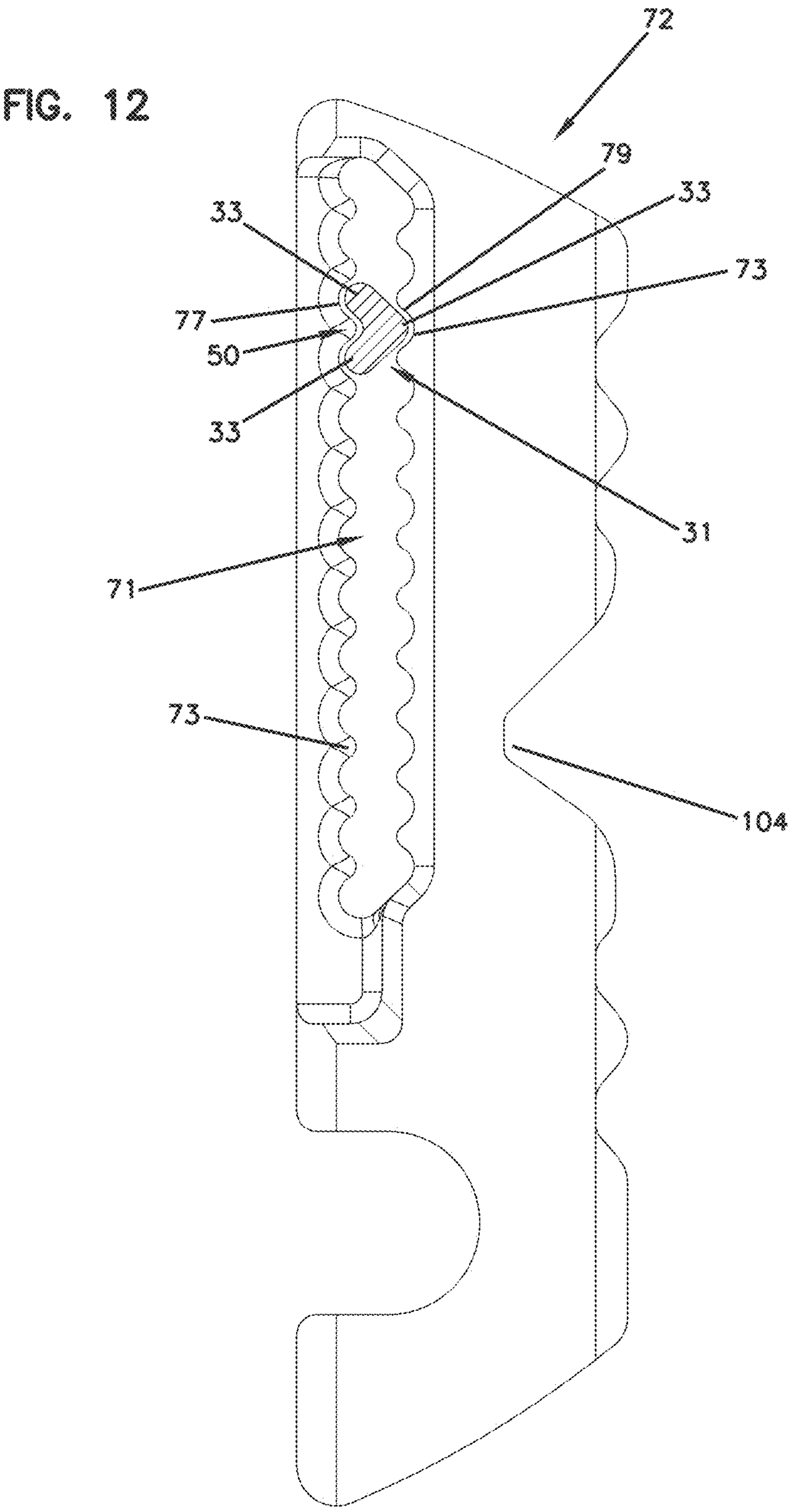
FIG. 12 is a cross-sectional view of a portion of the key follower of FIG. 4 positioned within the rack of FIG. 5.

The semi-cylindrical surfaces of the barrels 33 and semi-cylindrical grooves 73 increase the contact surface area of the pin-rack engagement feature 50. In the depicted example, as shown in FIG. 12, when mated, a single barrel 33 interfaces with a single groove of the second set of grooves 79. Further, in the depicted example, when mated, a pair of barrels 33 interfaces with a pair of grooves of the first set of grooves 77. Specifically, in the depicted example, the post 31 of each key follower 38 interfaces with both sets of grooves 77, 79 of each slot 71 of each rack 72 to further strengthen and stabilize the pin-rack engagement feature 50. In some examples, depending on the thickness of the rack 72 and the lengths of the posts 31, the post 31 does not extend entirely through the slot 71. The post 31 only need to interface, and interlock, with the slot 71 to ensure that the rack 72 and key followers 38 move together. Such an interfacing arrangement maintains strength of the pin-rack engagement feature 50 even as sizes of the components are reduced. It is considered within the scope of the present disclosure, that the key followers 38 can have a variety of different numbers of barrels 33 that interface with a variety of different numbers of either the first or second set of grooves 77, 79.

In some examples, barrels 33 and grooves 73 are formed to define complimentary non-circular geometric profiles, such as triangular or rectangular for example. In some examples, the racks 72 can include anti-picking grooves 81 at a side 83 of the rack 72 where the locking bar engaging grooves 104 are defined. Such grooves provide feedback when they are engaged by the locking bar 74, such feedback can mimic that feedback received with the locking bar 74 when positioned within the locking bar engaging grooves 104.

To rekey the lock cylinder 10, a valid key 43 is inserted into the keyway opening 44 and rotated. A tool (not shown) is inserted into the tool opening 46 and pushed against the carrier 70 to move the carrier 70 parallel to the longitudinal axis of the lock cylinder 10 until the spring catch 75 moves into a detent recess of the cylinder body 14. Moving the carrier 70 withdraws the posts 31 of the key followers 38 from the mating slots 71 of the racks 72 in a longitudinal direction, parallel with the longitudinal axis of the lock cylinder 10. The valid key is then removed and a second key (with different bitting from the first key) is inserted and rotated to release the spring catch 75. As the spring catch 75 leaves the detent recess of the cylinder body 14, the carrier 70 is biased toward the plug face 36 by the return spring 80, causing the posts 31 to insert, and interface with, into the slots 71 in a longitudinal direction, parallel with the longitudinal axis of the lock cylinder 10. This longitudinal movement of the posts 31 of the key followers 38 into the slots 71 of the racks 72 is shown in FIGS. 8-11. In some examples, as mentioned above, the key followers 38 and/or racks 72 can include features (e.g., a cone, rounded surfaces, etc.) that help guide the engagement of the posts 31 into the slots 71 and corresponding grooves 73. At this point, the lock cylinder 10 is keyed to the second (valid) key and the first key no longer operates the lock cylinder 10. In some examples, each post 31 can include stiffening rib and each slot 71 of the rack 72 can include a corresponding recess to accommodate stiffening rib.

As the number of bitting positions increases, the incremental distance between each bitting position decreases or becomes smaller. A stack up of tolerances from the engagement of multiple components can cause variations in the relative position of the locking bar engaging grooves 104 formed in the racks 72 during operation of lock cylinder 10. As shown in FIGS. 13 and 14, the locking bar engaging grooves 104 of each rack 72 are wider than the flange 102 of the locking bar 74. Thus, the locking bar 74 can have multiple positions within the locking bar engaging grooves 104 of the rack 72, including at least one valid position where the locking bar 74 is in the unlocked position.

FIG. 13 shows an example where the locking bar 74 is positioned within the locking bar engaging groove 104 of the rack 72 while the blocking portion 98 is removed from the locking bar engaging groove 30 of the cylinder body 14, thereby positioning the locking bar in the unlocked position. FIG. 14 shows an example where the locking bar 74 can be positioned within the locking bar engaging groove 104 of the rack 72 while the blocking portion 98 of locking bar 74 remains positioned within the locking bar engaging groove 30 of the cylinder body 14, thereby maintaining a locked locking bar position. As the racks 72 move with the key followers 38, the locking bar 74 contacts the side 83 of the rack 72 outside of the locking bar engaging groove 104 and remains in the locked position. In some examples, the locking bar 74 travels over the anti-picking grooves 81 as the racks 72 move.

Figure 16:
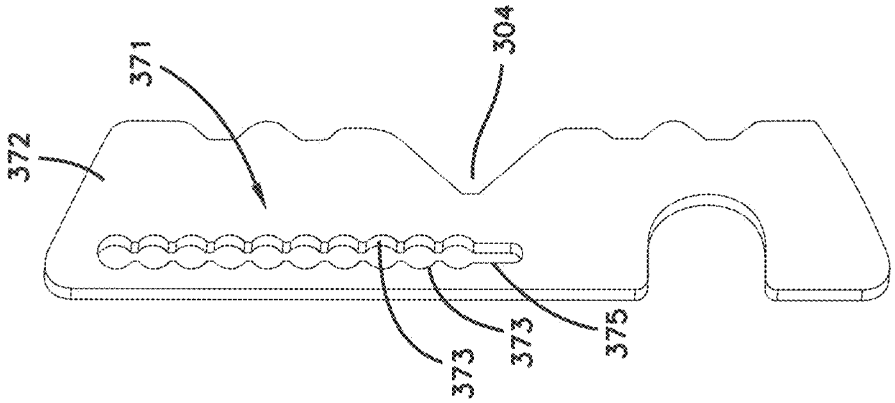
FIG. 16 is a perspective view of another example of a rack according to an embodiment of this disclosure associated with the key follower of FIG. 15.
Figure 15:
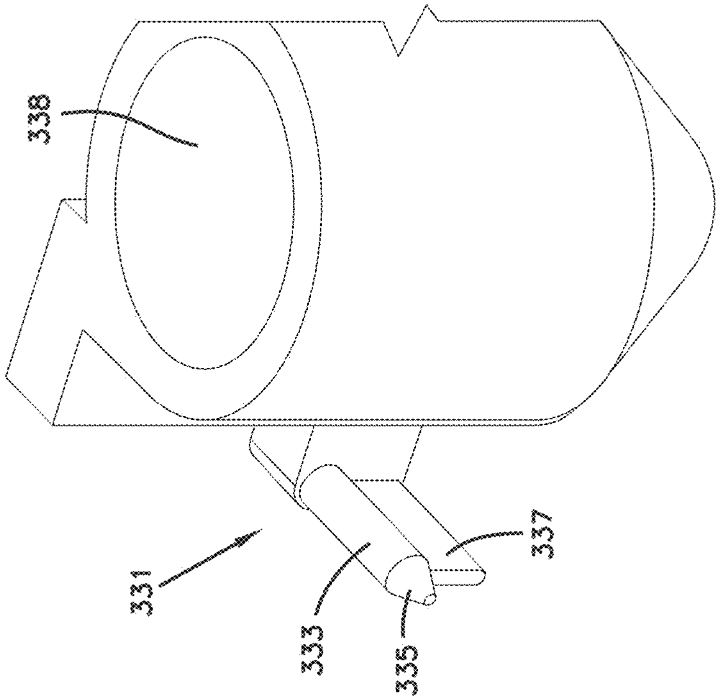
FIG. 15 is a perspective view of another example of a key follower according to an embodiment of this disclosure.

Another example of a pin-rack engagement feature according to an embodiment of the present disclosure is shown in FIGS. 15 and 16. The pin-rack engagement feature includes a post 331 of spring-loaded pins 338 engaged with a mating slot 371 of racks 372. Complementary engagement surfaces of the post 331 and the slot 371 engage with one another to block movement of the spring-loaded pins 338 relative to the racks 372. As shown in FIG. 15, each post 331 includes a barrel 333 and a stiffening rib 337. The barrel 333 defines a semi-cylindrical outer surface. In some examples, a cone 335 is arranged at the ends of the barrels 333 to guide insertion of post 331 into slot 371. As seen in FIG. 16, the mating slot 371 includes a series of semi-cylindrical grooves 373. A series of grooves 373 extends along either side of mating slot 371. A recess 375 is positioned at one end of the slot 371 to accommodate the stiffening rib 337. The semi-cylindrical surfaces of the barrel 333 and semi-cylindrical grooves 373 maximize a contact surface area of the pin-rack engagement feature. In some examples, the barrels 333 and the grooves 373 are formed to define complimentary non-circular geometric profiles, such as triangular or rectangular for example. In the illustrative embodiment, the slot 371 extends through and is bounded on all sides by the rack 372 as shown in FIG. 16. In some examples, the slot 371 does not extend through the entire rack 372. The slot 371 is generally positioned on an opposite side of the rack 372 from the respective locking bar engaging groove 304 of that rack.

Figure 18:
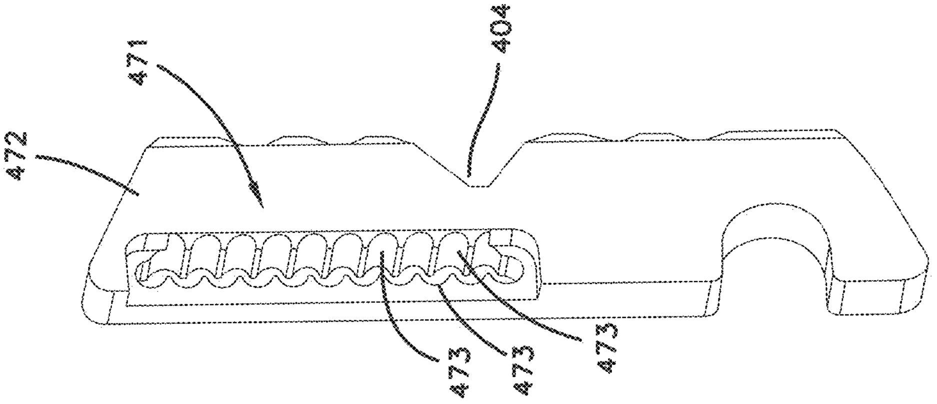
FIG. 18 is a perspective view of another example of a rack according to an embodiment of this disclosure associated with the key follower of FIG. 17.
Figure 17:
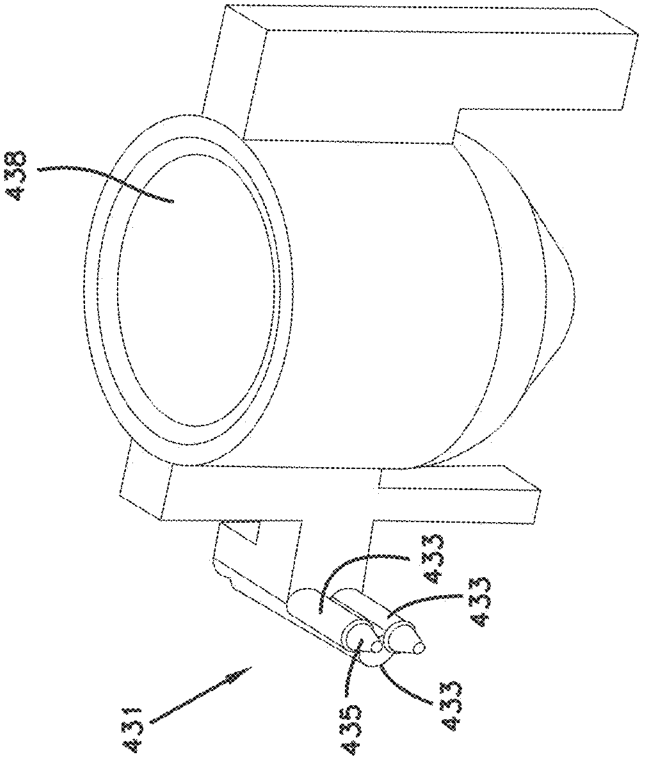
FIG. 17 is a perspective view of another example of a key follower according to an embodiment of this disclosure.

Another example of a pin-rack engagement feature according to an embodiment of the present disclosure is shown in FIGS. 17 and 18. The pin-rack engagement feature includes a post 431 of spring-loaded pins 438 engaged with a mating slot 471 of racks 472. Complementary engagement surfaces of the post 431 and the slot 471 engage with one another to block movement of the spring-loaded pins 438 relative to the racks 472. As shown in FIG. 17, each post 431 includes a pair of barrels 433. Each barrel 433 defines a semi-cylindrical outer surface. In some examples, a cone 435 is arranged at the end of each of the barrels 433 to guide insertion of posts 431 into slot 471. As seen in FIG. 18, the mating slot 471 includes a series of semi-cylindrical grooves 473. A series of grooves 473 extends along either side of mating slot 471. The semi-cylindrical surfaces of each barrel 433 and semi-cylindrical grooves 473 maximize a contact surface area of the pin-rack engagement feature. In some examples, the barrels 433 and the grooves 473 are formed to define complimentary non-circular geometric profiles, such as triangular or rectangular for example. In the illustrative embodiment, the slot 471 extends through and is bounded on all sides by the rack 472 as shown in FIG. 18. In some examples, the slot 471 does not extend through the entire rack 472. The slot 471 is generally positioned on an opposite side of the rack 472 from the respective locking bar engaging groove 404 of that rack.

Figure 20:
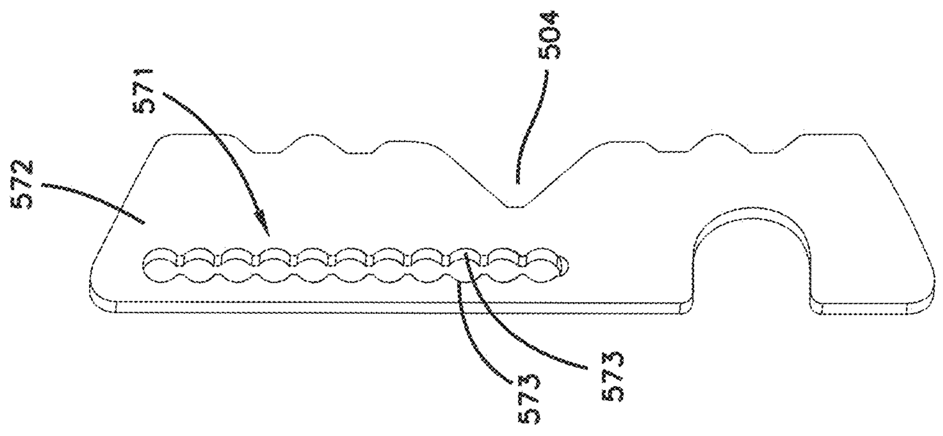
FIG. 20 is a perspective view of another example of a rack according to an embodiment of this disclosure associated with the key follower of FIG. 19.
Figure 19:
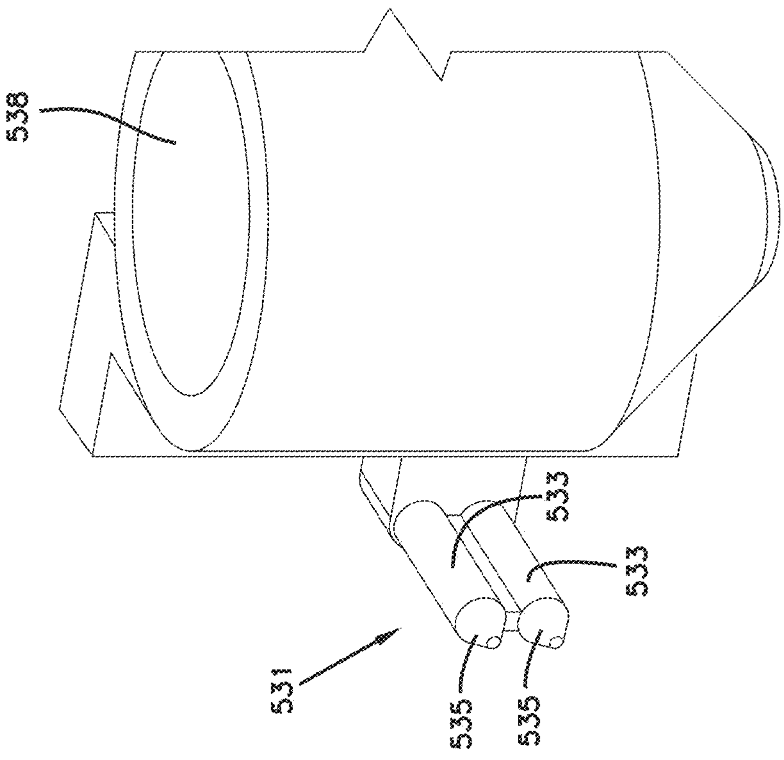
FIG. 19 is a perspective view of another example of a key follower according to an embodiment of this disclosure.

Another example of a pin-rack engagement feature according to an embodiment of the present disclosure is shown in FIGS. 19 and 20. The pin-rack engagement feature includes a post 531 of spring-loaded pins 538 engaged with a mating slot 571 of racks 572. Complementary engagement surfaces of the post 531 and the slot 571 engage with one another to block movement of the spring-loaded pins 538 relative to the racks 572. As shown in FIG. 19, each post 531 includes a pair of vertically stacked of barrels 533. Each barrel 533 defines a semi-cylindrical outer surface. In some examples, a cone 535 is arranged at the end of each of the barrels 533 to guide insertion of posts 531 into slot 571. As seen in FIG. 20, the mating slot 571 includes a series of semi-cylindrical grooves 573. A series of grooves 573 extends along either side of mating slot 571. The semi-cylindrical surfaces of each barrel 533 and semi-cylindrical grooves 573 maximize a contact surface area of the pin-rack engagement feature. In some examples, the barrels 533 and the grooves 573 are formed to define complimentary non-circular geometric profiles, such as triangular or rectangular for example. In the illustrative embodiment, the slot 571 extends through and is bounded on all sides by the rack 572 as shown in FIG. 20. In some examples, the slot 571 does not extend through the entire rack 572. The slot 571 is generally positioned on an opposite side of the rack 572 from the respective locking bar engaging groove 504 of that rack.

Figure 21:
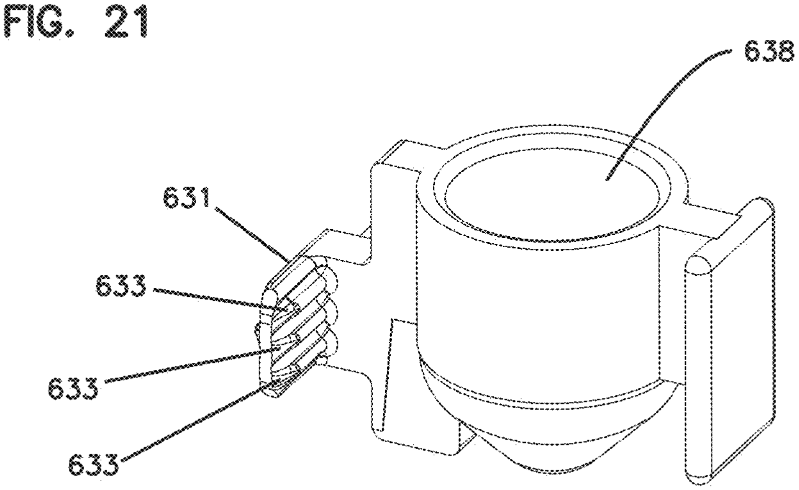
FIG. 21 is a perspective view of another example of a key follower according to an embodiment of this disclosure.
Figure 22:
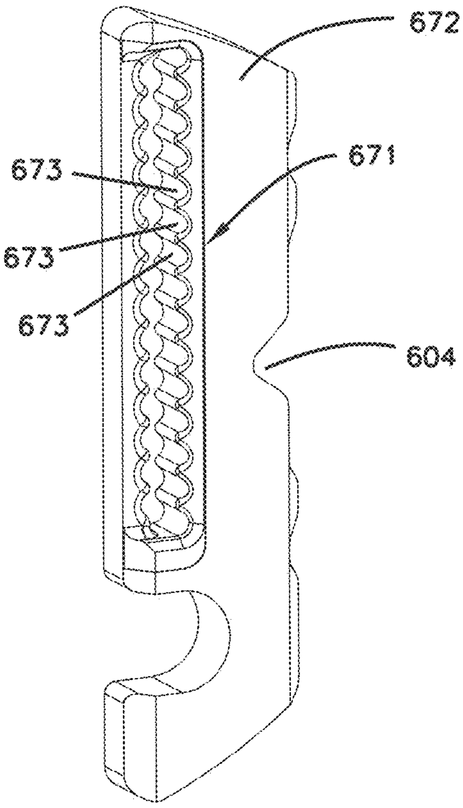
FIG. 22 is a perspective view of another example of a rack according to an embodiment of this disclosure associated with the key follower of FIG. 21.

A still further example of a pin-rack engagement feature according to an embodiment of the present disclosure is shown in FIGS. 21 and 22. The pin-rack engagement feature includes a post 631 of pins 638 engaged with a mating slot 671 of racks 672. Complementary engagement surfaces of the post 631 and the slot 671 engage with one another to block movement of the spring-loaded pins 638 relative to the racks 672.

As shown in FIG. 21, each post 631 includes set of ridges 633 configured to integrate with the slot 671. The ridges 633 may also be said to be formed from a plurality of barrels, as discussed above. As seen in FIG. 22, the mating slot 671 includes a series of semi-cylindrical grooves 673. The grooves 673 extends along either side of the mating slot 671. The ridges 633 of the post 631 and semi-cylindrical groove 673 maximize a contact surface area of the pin-rack engagement feature. In some examples, the post 631 and the grooves 673 are formed to define complimentary non-circular geometric profiles, such as triangular or rectangular for example. In the illustrative embodiment, the slot 671 extends through and is bounded on all sides by the rack 672 as shown in FIG. 22. In some examples, the slot 671 does not extend through the entire rack 672.

Figure 23:
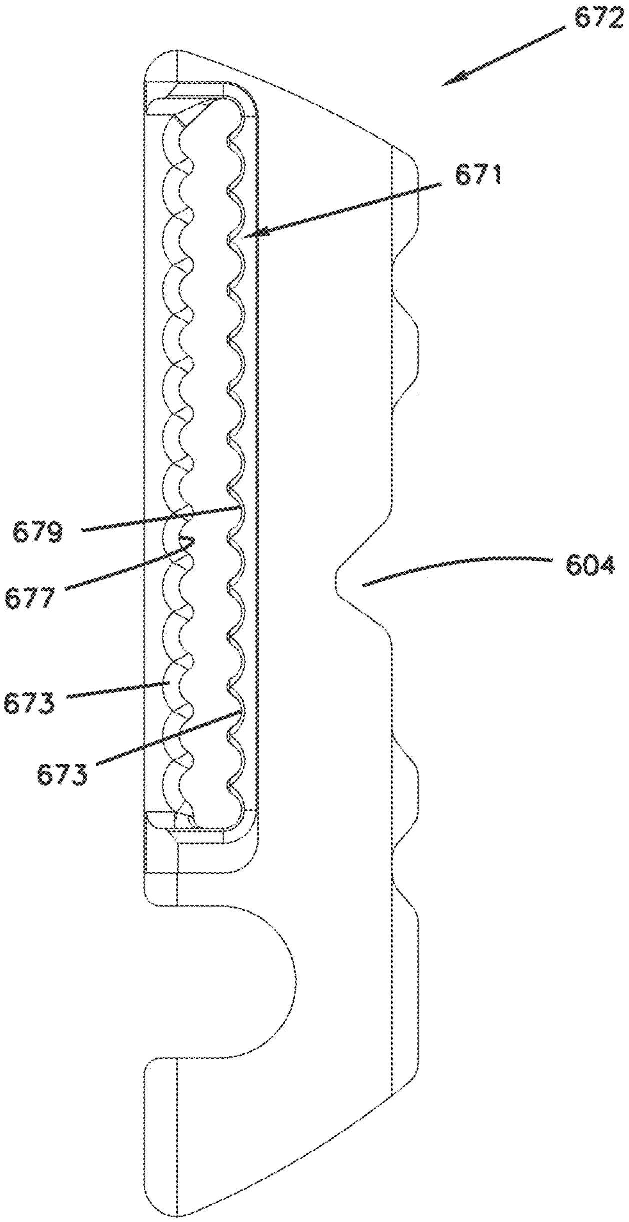
FIG. 23 is a front view of the rack of FIG. 22.
Figure 24:
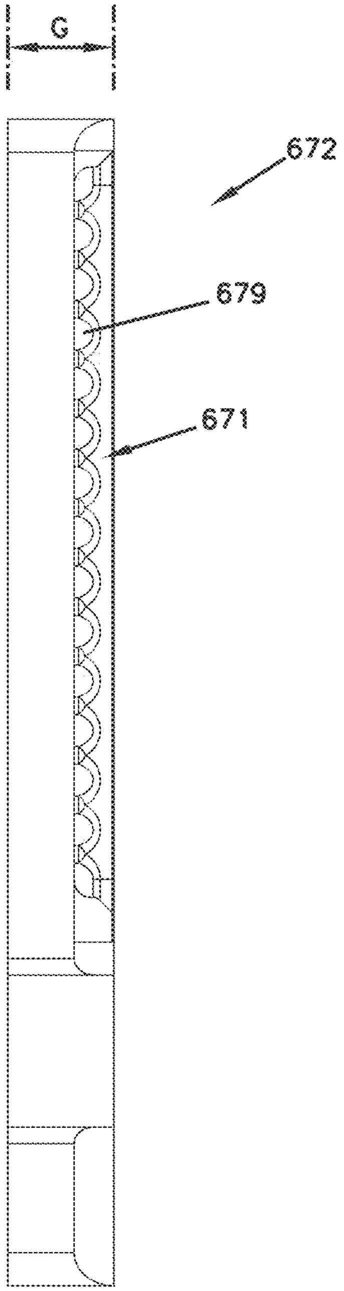
FIG. 24 is a side view of the rack of FIG. 22.

As seen in FIGS. 22-24, the slot 671 includes a series of semi-cylindrical grooves 673. The series of grooves 673 extends along either side of the slot 671 and are offset from one another to correspond to the pattern of ridges 633. The grooves 673 of each rack 672 include a first set of grooves 677, positioned closest to the key followers (e.g., pins 638), and a second set of grooves 679 opposite from the first set of grooves 677 in the slot 671. In some examples, as shown in FIG. 24, the second set of grooves 679 can have a length G that is greater than a comparable length of the first set of grooves 677. In the illustrative embodiment, the slot 671 extends through and is bounded on all sides by the rack 672, as shown in FIG. 22. In some examples, the slot 671 does not extend through the entire rack 672. The slot 671 is generally positioned on an opposite side of the rack 672 from the respective locking bar engaging groove 604 of that rack.

Figure 25:
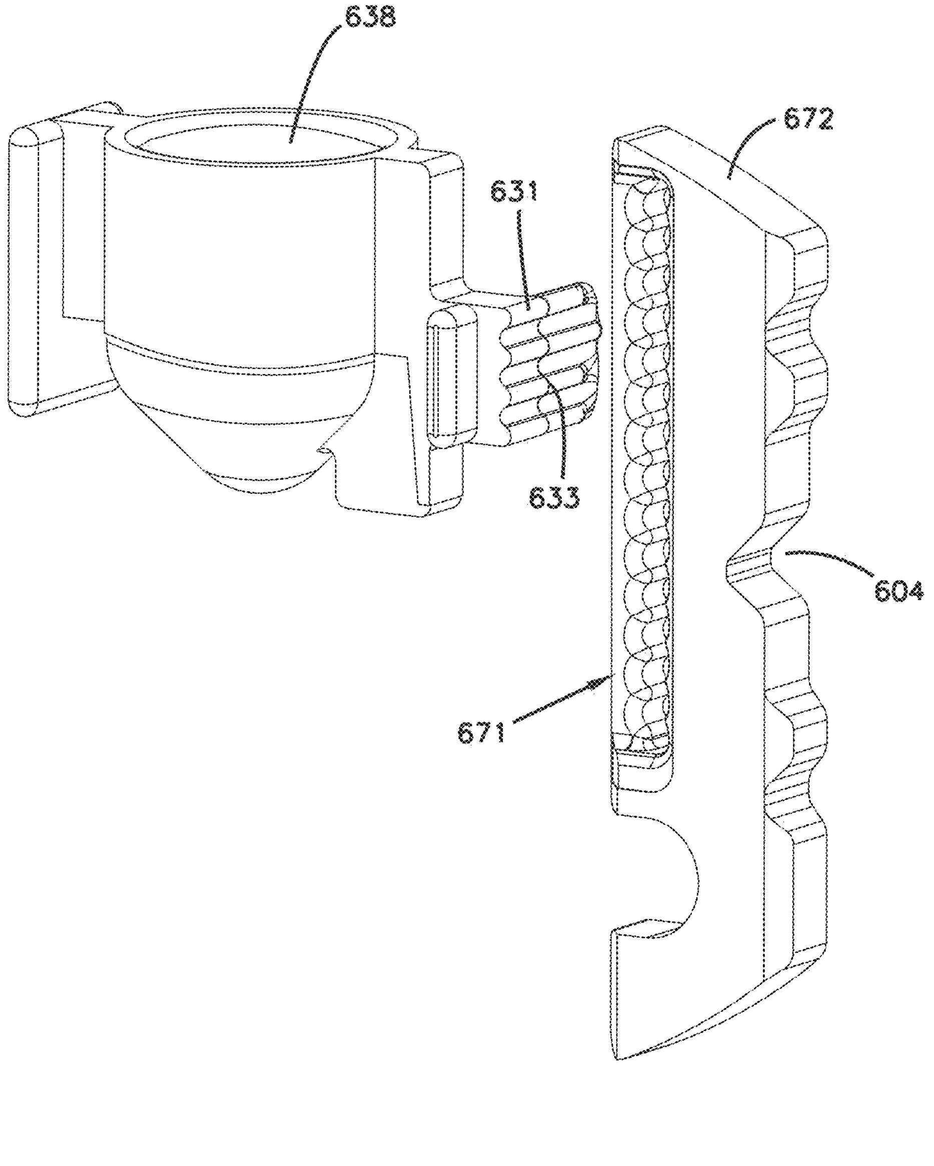
FIGS. 25-27 are perspective views of the key follower of FIG. 21 and rack of FIG. 22 mating.
Figure 26:
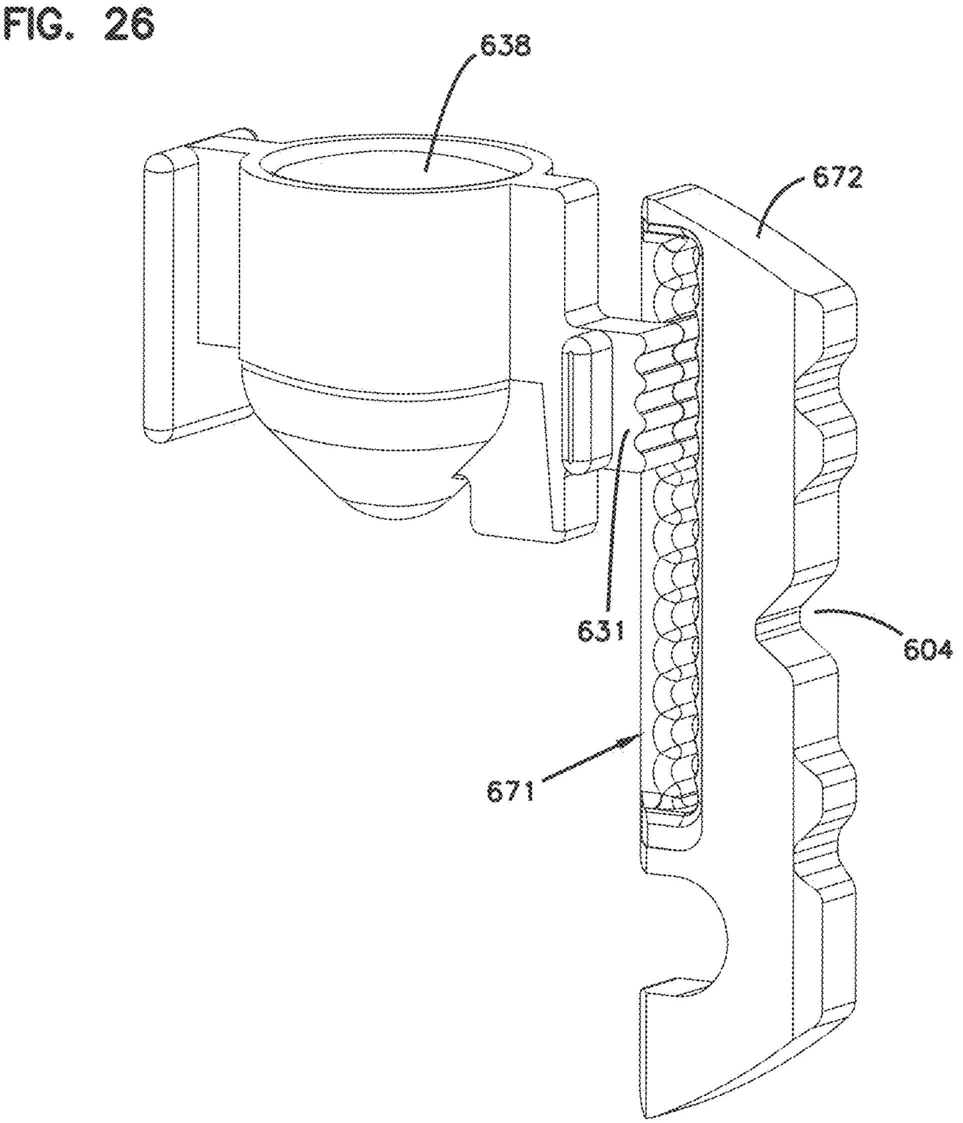
Figure 27:
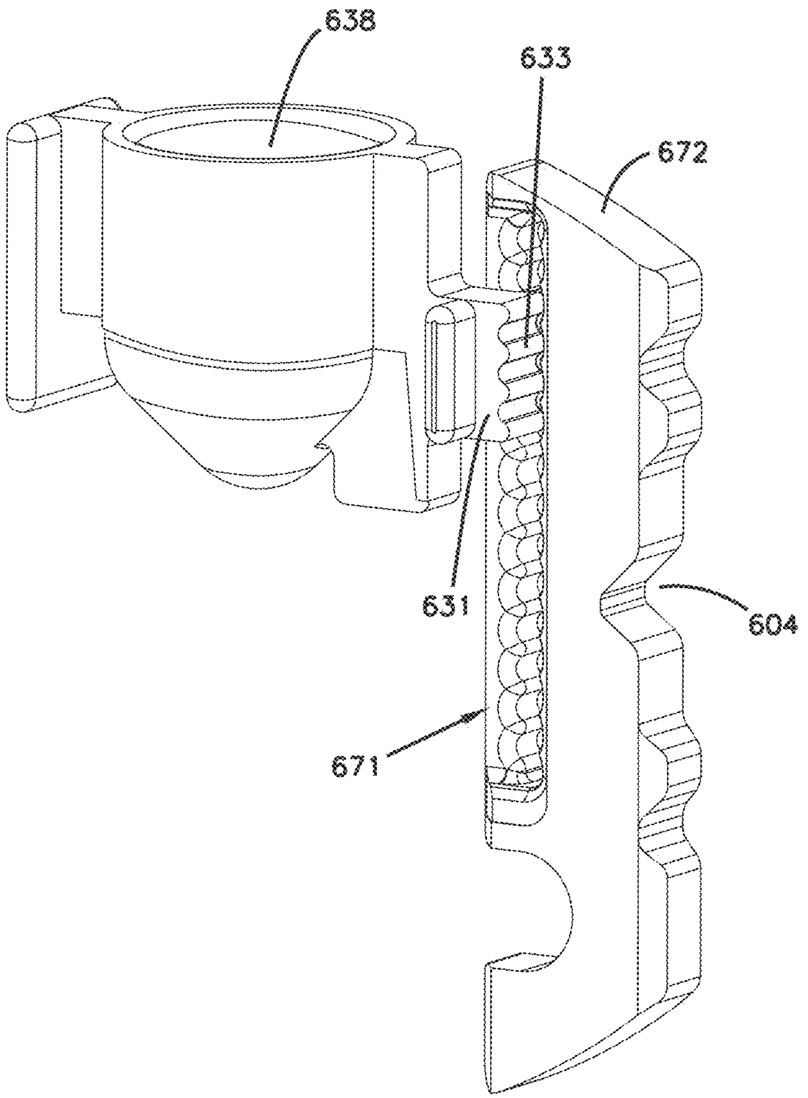
Figure 28:
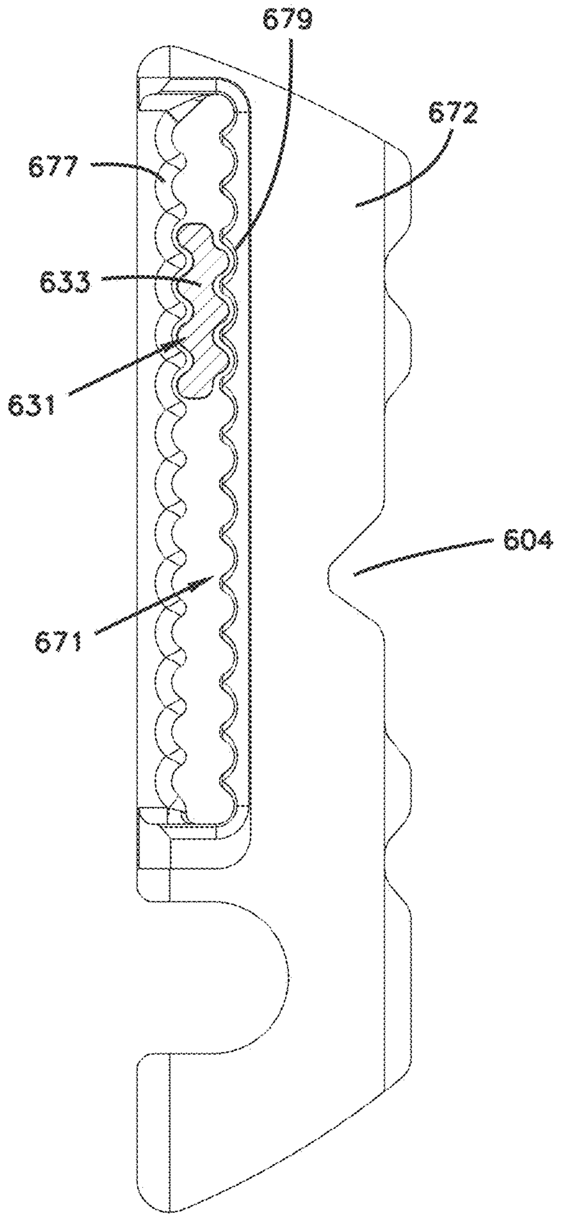
FIG. 28 is a cross-sectional view of a portion of the key follower of FIG. 21 positioned within the rack of FIG. 22.

In the example sequence shown in FIGS. 25-27 showing engagement between a pin 638 and rack 672, the semi-cylindrical surfaces of the ridges 633 and semi-cylindrical grooves 673 increase the contact surface area of the pin-rack engagement feature. In the depicted example, as shown in FIG. 27, when mated, a single barrel 33 interfaces with a single groove of the second set of grooves 79. Further, in the depicted example, when mated, the ridges 633 interface with a pair of grooves of the first set of grooves 677, as well as grooves 679.

Specifically, in the depicted example, the post 631 of each key follower 638 interfaces with both sets of grooves 677, 679 of each slot 671 of each rack 672 to further strengthen and stabilize the pin-rack engagement feature. In some examples, depending on the thickness of the rack 672 and the lengths of the posts 631, the post 631 does not extend entirely through the slot 671. The post 631 only need to interface, and interlock, with the slot 671 to ensure that the rack 672 and key followers (e.g., pins 638) move together. Such an interfacing arrangement maintains strength of the pin-rack engagement feature even as sizes of the components are reduced. It is considered within the scope of the present disclosure, that the key followers 638 can have a variety of different sizes or shapes that interface with a variety of different numbers of either the first or second set of grooves 677, 679. In particular, with respect to the embodiment shown, to accommodate the additional number of barrels 633 while maintaining a constant number of possible relative positions between the pin 638 and rack 672, a corresponding increase in a number of grooves 673 within the slot 671 are provided relative to the number of grooves 573 within the slot 571 seen in FIG. 19. As compared to the embodiments discussed previously, the increased pin size increases a strength of the post 631, particularly in the vertical direction. This improves the overall strength of the lock cylinder, in avoiding damage in response to objects being inserted into a keyway opening, such as keyway opening 244.

The features of one spring-loaded pin 38, 338, 438, 538 or rack 72, 372, 472, 572 can be used in any other spring-loaded pin 38, 338, 438, 538 or rack 72, 372, 472, 572. Spring-loaded pins 38, 338, 438, 538 can include more or less posts 31, 331, 431, 531 and racks 72, 372, 472, 572 can include more or less grooves 73, 373, 473, 573.

Another example of a pin-rack engagement feature according to an embodiment of the present disclosure is shown in FIGS. 29-35. The pin-rack engagement feature includes a post 731 of a spring-loaded pin 738 engaged with a mating slot 771 of racks 772. Complementary engagement surfaces of the post 731 and the slot 771 engage with one another to block movement of the spring-loaded pin 738 relative to the racks 772.

Figure 29:
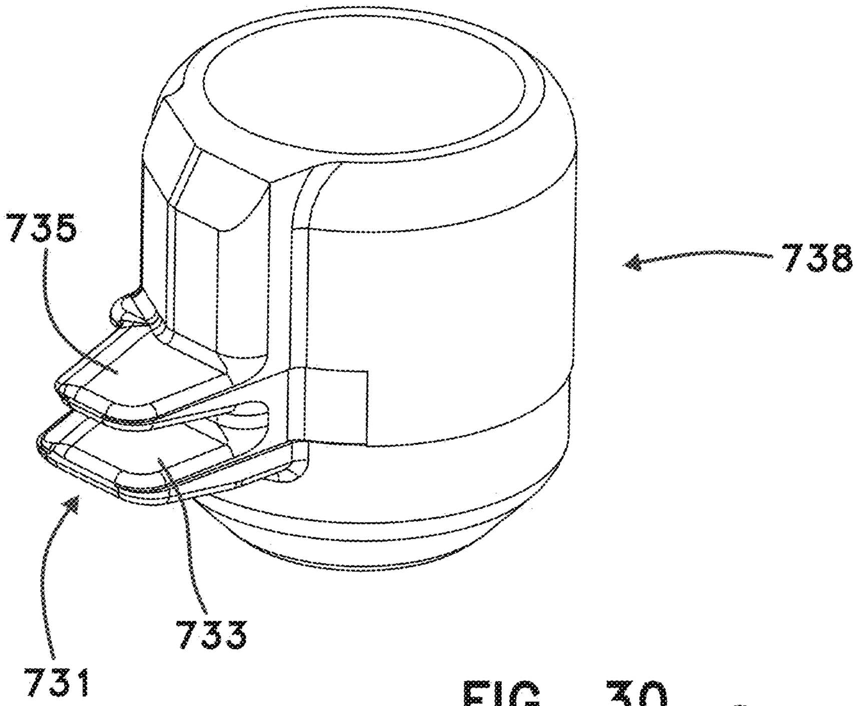
FIG. 29 is a perspective view of another example of a key follower according to an embodiment of this disclosure.

As shown in FIG. 29, the spring-loaded pin 738 has a generally cylindrical shape. However, it is considered within the scope of the present disclosure that the spring-loaded pin 738 could have a variety of shapes depending on the shape of the recess in which it is positioned within the cylinder plug. In the depicted example, the post 731 of the spring-loaded pin 738 includes a first projection 733 and a second projection 735. In some examples, the first and second projections 733, 735 are vertically aligned with one another. In some examples, the first and second projections 733, 735 are vertically aligned with one another perpendicular to the longitudinal axis of the cylinder body. In some examples, the first projection 733 and the second projection 735 are wedge shaped and can include rounded edges to facilitate insertion into the slot 771.

Figure 30:
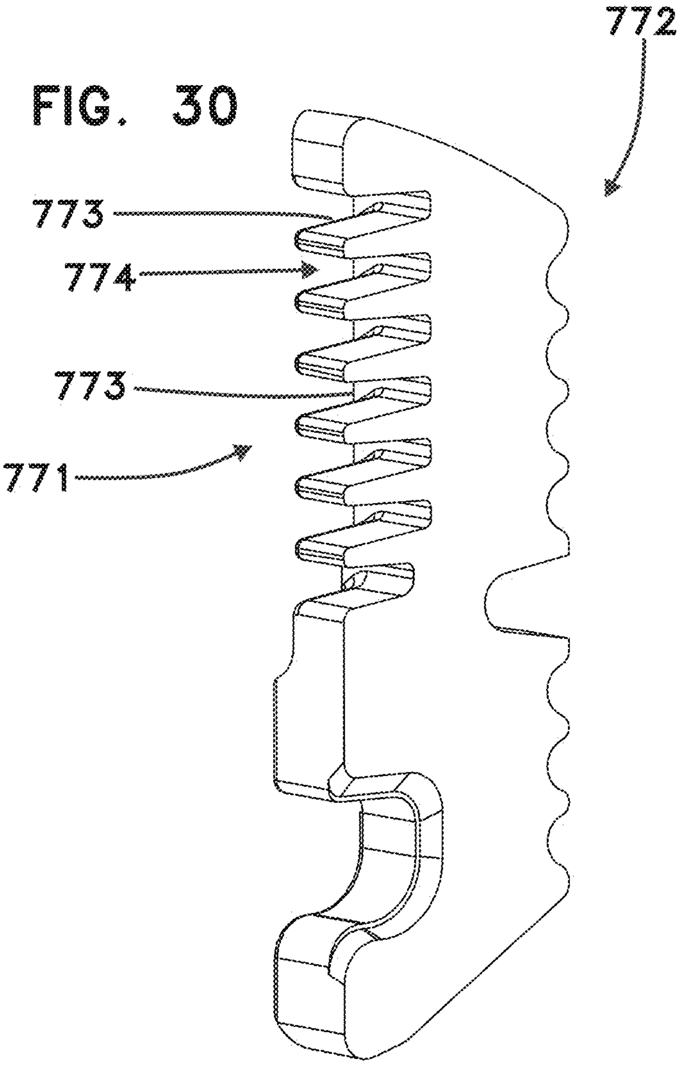
FIG. 30 is a perspective view of another example of a rack according to an embodiment of this disclosure associated with the key follower of FIG. 29.
Figure 31:
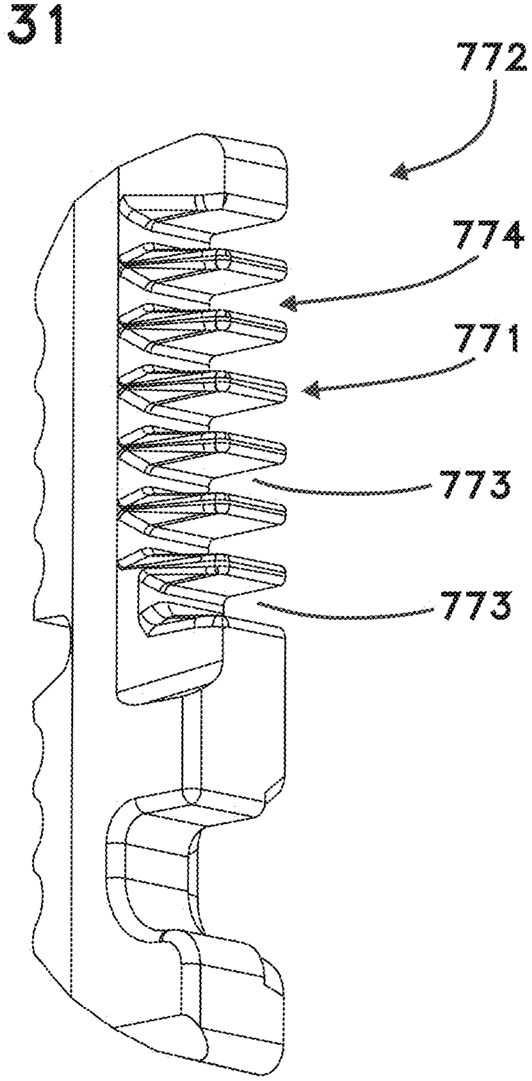
FIG. 31 is a perspective view of the rack of FIG. 30.

As shown in FIGS. 30 and 31, the mating slot 771 of the rack 772 includes a series of key follower post recesses 773. In some examples, the key follower post recesses 773 are open at a vertical side 774. In some examples, the vertical side 774 is perpendicular to the longitudinal axis of the lock cylinder 10. The first and second projections 733, 735 of the post 731 of the spring-loaded pin 738 and the series of key follower post recesses 773 of the slot 771 of the rack 772 maximize a contact surface area of the pin-rack engagement feature. In some examples, the vertical side 774 is adjacent the spring-loaded pin 738 when complementary engagement surfaces of the post 731 and the slot 771 engage with one another.

Figure 32:
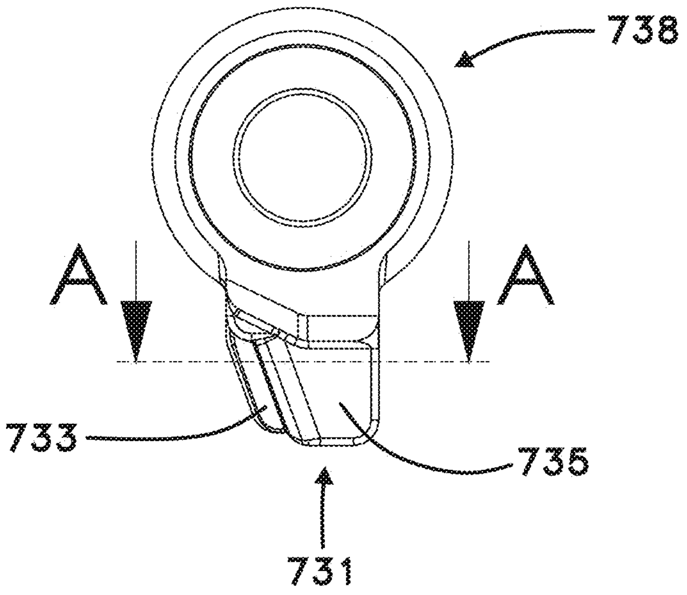
FIG. 32 is a top view of the key follower of FIG. 29 engaged with the rack of FIG. 30.
Figure 33:
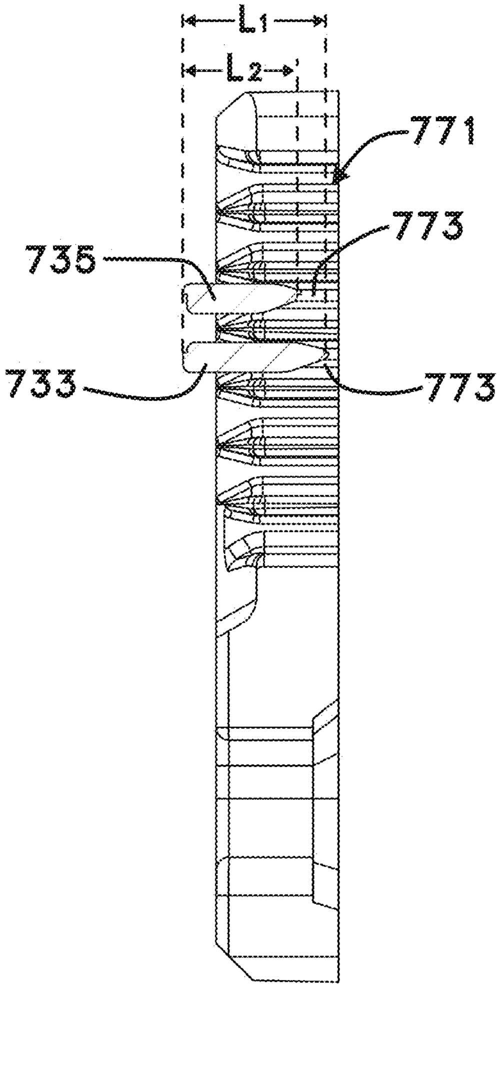
FIG. 33 is a cross sectional view of the key follower of FIG. 29 engaged with the rack of FIG. 30 along line A-A in FIG. 32.

FIG. 32 shows a top view of the spring-loaded pin 738, and FIG. 33 shows a cross-sectional view along line A-A in FIG. 32 with the post 731 engaged in the slot 771. As shown, the first and second projections 733, 735 of the post 731 have a first length L1 and a second length L2, respectively. The first and second lengths L1, L2 are measured parallel to the longitudinal axis of the lock cylinder 10. In some examples, the first length L1 is greater than the second length L2. In some examples, the first length L1 is less than the second length L2. In some examples, the first length L1 is equal to the second length L2.

Figure 34:
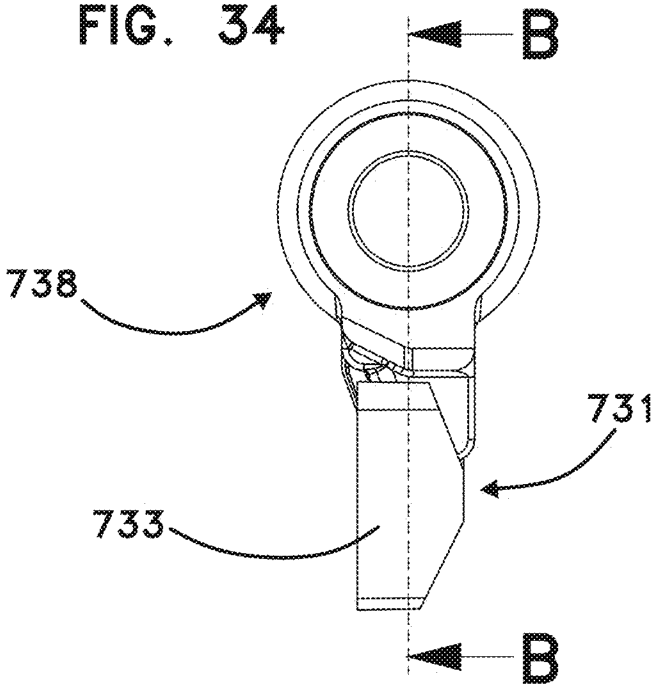
FIG. 34 is a bottom view of the key follower of FIG. 29 engaged with the rack of FIG. 30.
Figure 35:
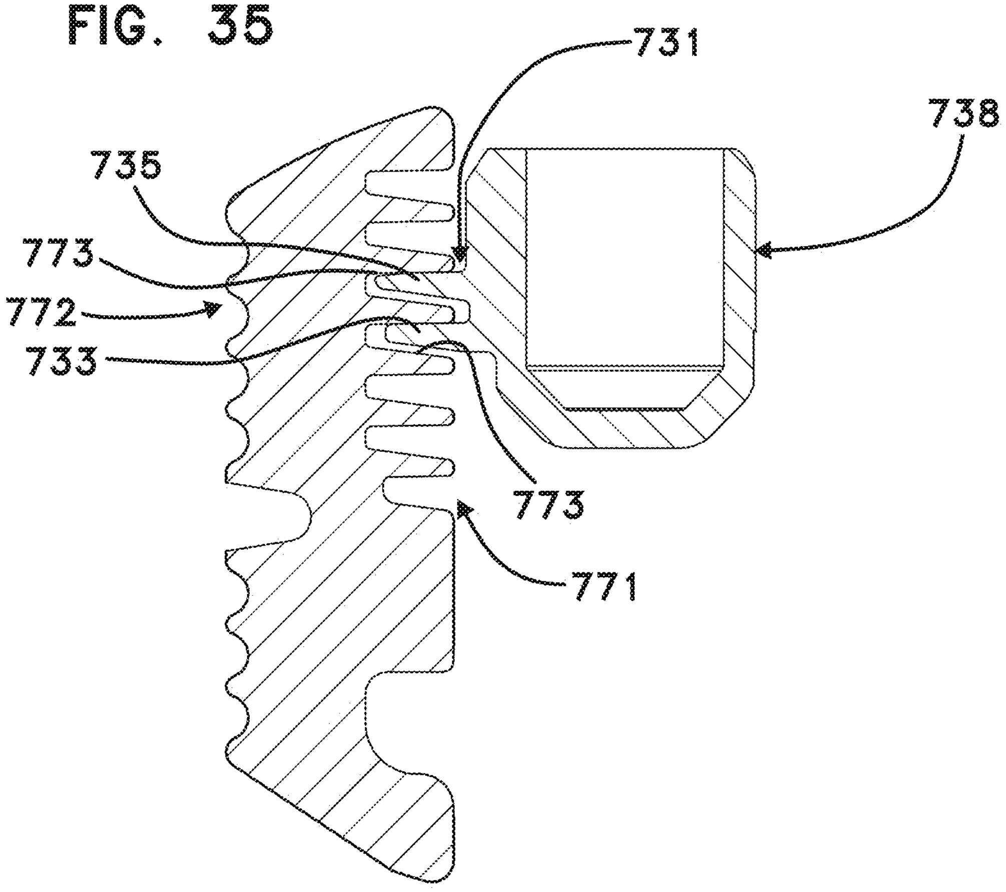
FIG. 35 is a cross-sectional view of the key follower of FIG. 29 engaged with the rack of FIG. 30 along line B-B in FIG. 34.

FIG. 34 shows a bottom view of the spring-loaded pin 738, and FIG. 35 shows a cross-sectional view along line B-B in FIG. 34 with the post 731 engaged in the slot 771.

Another example of a pin-rack engagement feature according to an embodiment of the present disclosure is shown in FIGS. 36-42. The pin-rack engagement feature includes a post 831 of a spring-loaded pin 838 engaged with a mating slot 871 of racks 872. Complementary engagement surfaces of the post 831 and the slot 871 engage with one another to block movement of the spring-loaded pin 838 relative to the racks 872.

Figure 36:
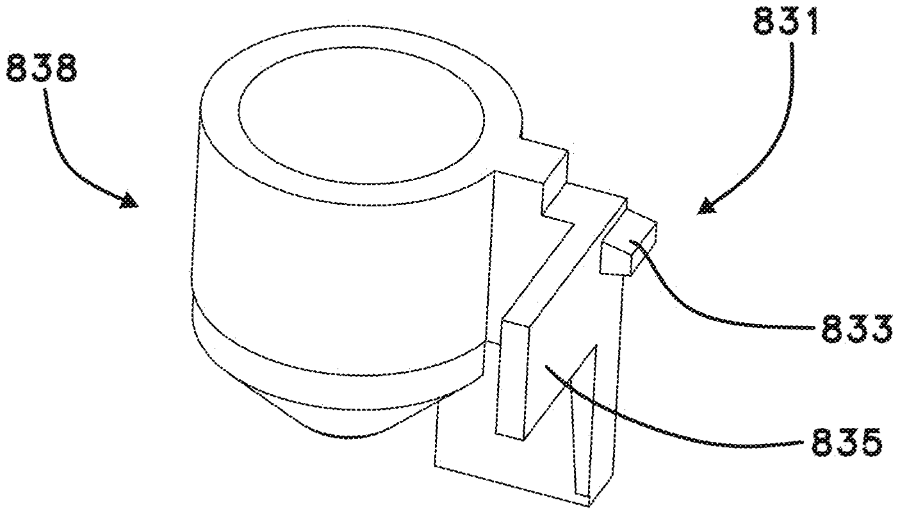
FIG. 36 is a perspective view of another example of a key follower according to an embodiment of this disclosure.

As shown in FIG. 36, the spring-loaded pin 838 has a generally cylindrical shape. However, it is considered within the scope of the present disclosure that the spring-loaded pin 838 could have a variety of shapes depending on the shape of the recess in which it is positioned within the cylinder plug.

In the depicted example, the post 831 of the spring-loaded pin 838 includes a projection 833 and a fin 835. In the depicted example, the projection 833 is positioned on the fin 835. In some examples, the projection 833 has linear slides. In some examples, the projection 833 has a semi-cylindrical profile. In some examples, the fin 835 has linear slides and a rectangular shape. In some examples, the fin 835 has rounded edges.

Figure 37:
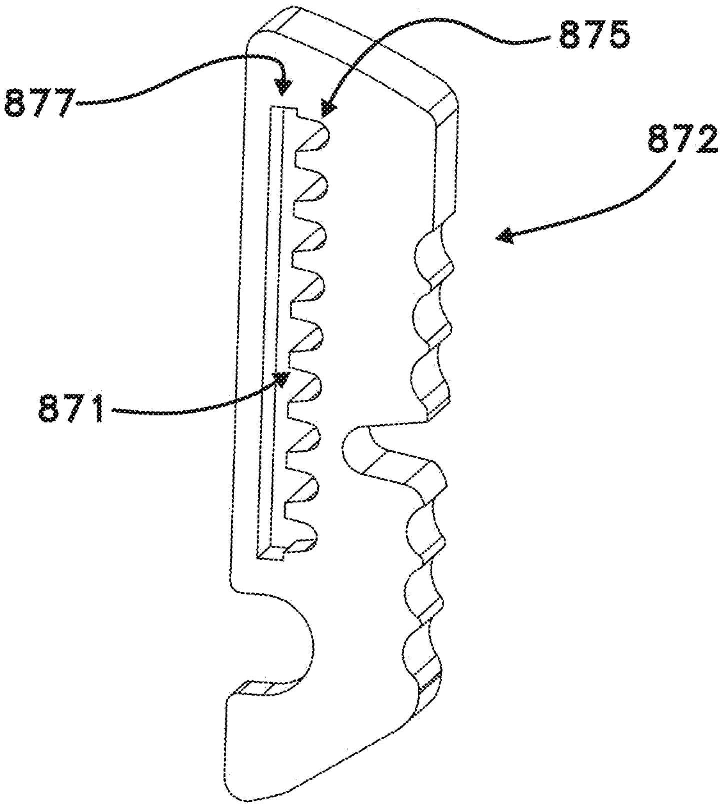
FIG. 37 is a perspective view of another example of a rack according to an embodiment of this disclosure associated with the key follower of FIG. 36.

As shown in FIG. 37, the mating slot 871 of the rack 872 extends at least partially through, and is bounded by, the rack 872. The slot 871 has a first side 875 and a second side 877 that extend parallel with one another along a portion of the length of the rack 872. The slot 871 includes a series of engagement grooves 879 (shown in FIG. 38) arranged along the first side 875 of the slot 871. The slot 871 also includes a linear aperture 891 (shown in FIG. 38) arranged along the second side 877 of the slot 871, immediately adjacent the series of engagement grooves 879. In some examples, each of the series of engagement grooves 879 is semi-cylindrical. In some examples, the linear aperture 891 is partially rectangular. In some examples, each of the series of engagement grooves 879 mirrors the profile of the projection 833 of the post 831 of the pin 838, and the linear aperture 891 is sized and shaped to receive the fin 835 of the post 831 of the pin 838.

Figure 38:
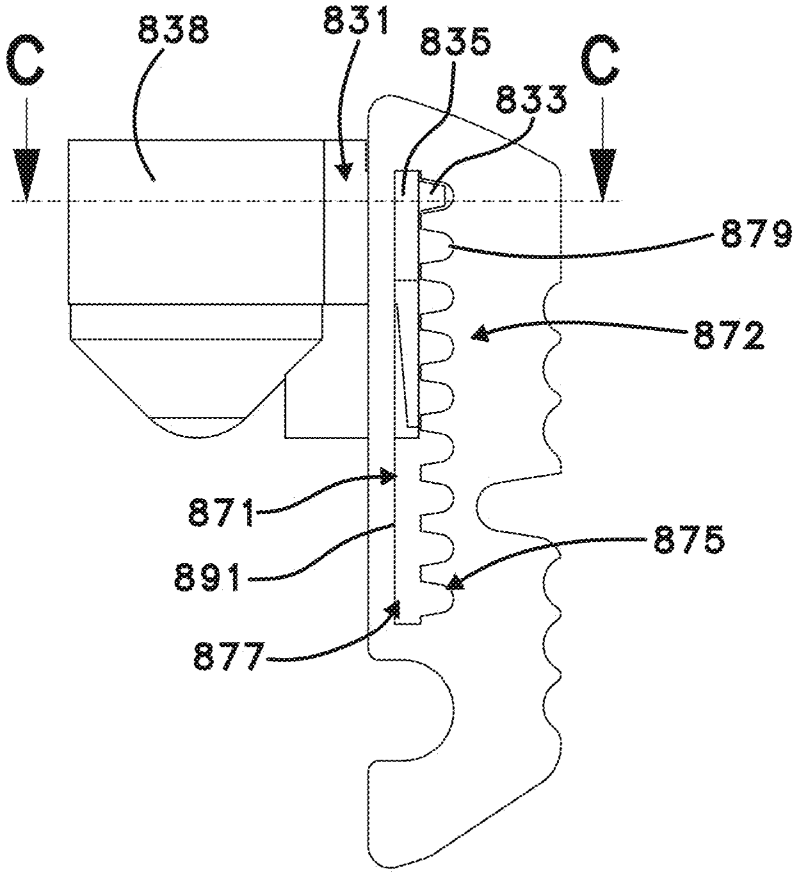
FIG. 38 is a side view of the key follower of FIG. 36 engaged with the rack of FIG. 37.
Figure 39:
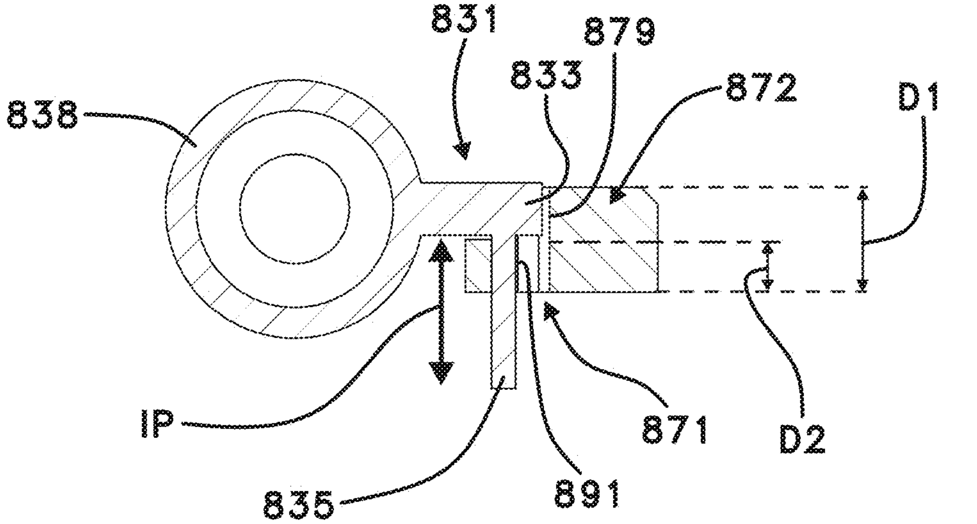
FIG. 39 is a cross-sectional view of the key follower of FIG. 36 engaged with the rack of FIG. 37 along line C-C in FIG. 38.

FIG. 38 shows a side view of the spring-loaded pin 838 and the rack 872 engaged with one another. FIG. 39 shows a cross-sectional view along line C-C in FIG. 38 with the post 831 engaged in the slot 871.

The pin 838 and the rack 872 have an interfacing path IP along which the rack 872 and pin 838 engage and disengage with one another. In some examples, the rack 872 moves in and out of engagement with the pin 838. In some examples, the interfacing path IP is parallel with the longitudinal axis of the of the cylinder body. In some examples, the fin 835 extends in the same direction as the interfacing path IP.

As shown in FIG. 39, the first side 875 of the slot 871 has a first depth D1 measured parallel to the longitudinal axis of the cylinder body 14, and the second side 877 of the slot has a second depth D2, measured parallel to the longitudinal axis of the cylinder body 14. In some examples, the first depth D1 is greater than the second depth D2. As shown, the first side 875 of the slot 871 receives the projection 833 and the second side 877 of the slot 871 receives the fin 835. In some examples, the fin 835 extends through, and past, the slot 871 when the post 831 is received in the slot 871. In some examples, the fin 835 extends further through the slot 871 than the projection 833.

Figure 40:
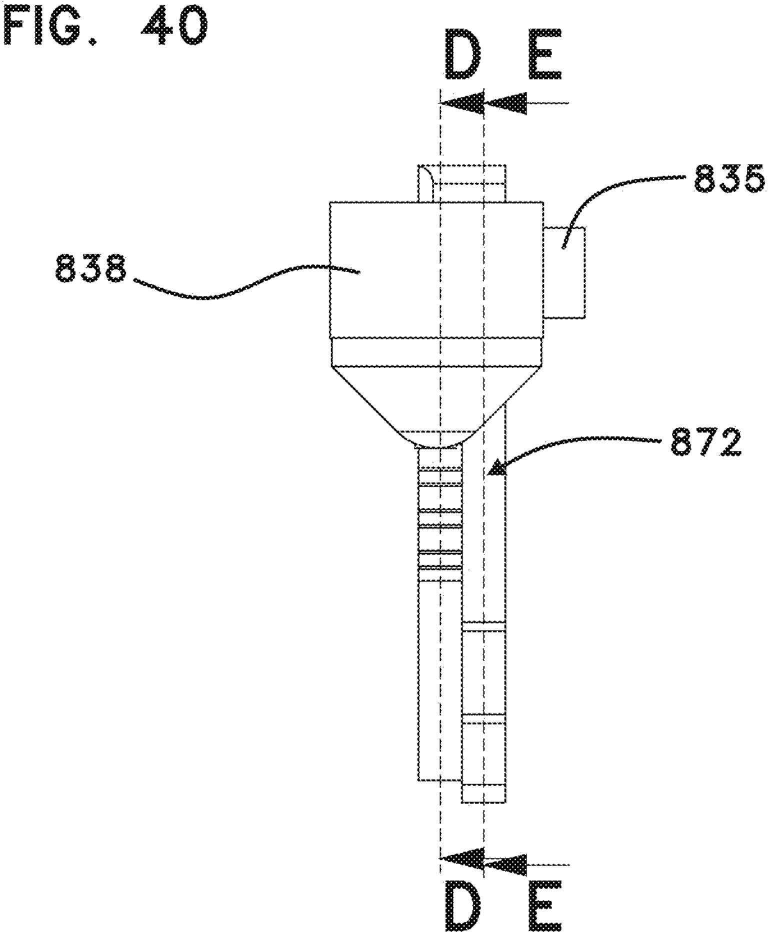
FIG. 40 is a side view of the key follower of FIG. 36 engaged with the rack of FIG. 37.
Figure 41:
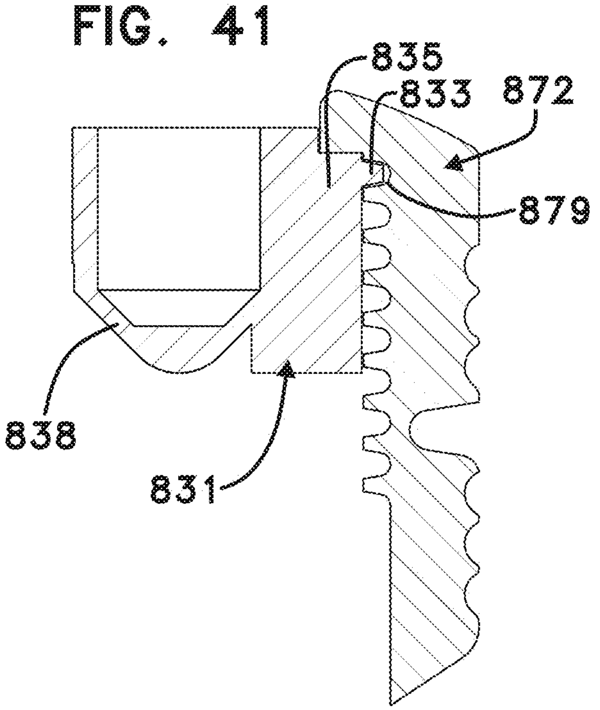
FIG. 41 is a cross-sectional view of the key follower of FIG. 36 engaged with the rack of FIG. 37 along line D-D in FIG. 40.
Figure 42:
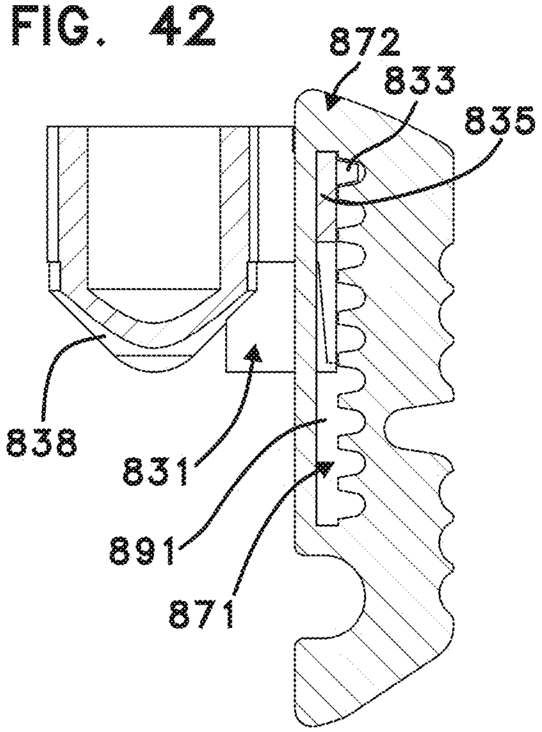
FIG. 42 is a cross-sectional view of the key follower of FIG. 36 engaged with the rack of FIG. 37 along line E-E in FIG. 40.
Figure 43:
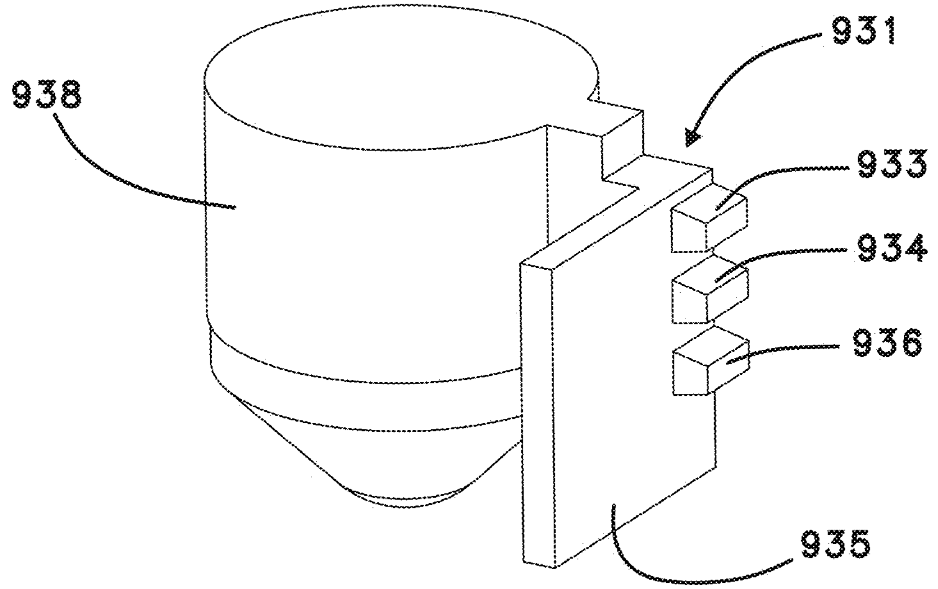
FIG. 43 is a perspective view of another example of a key follower according to an embodiment of this disclosure.
Figure 44:
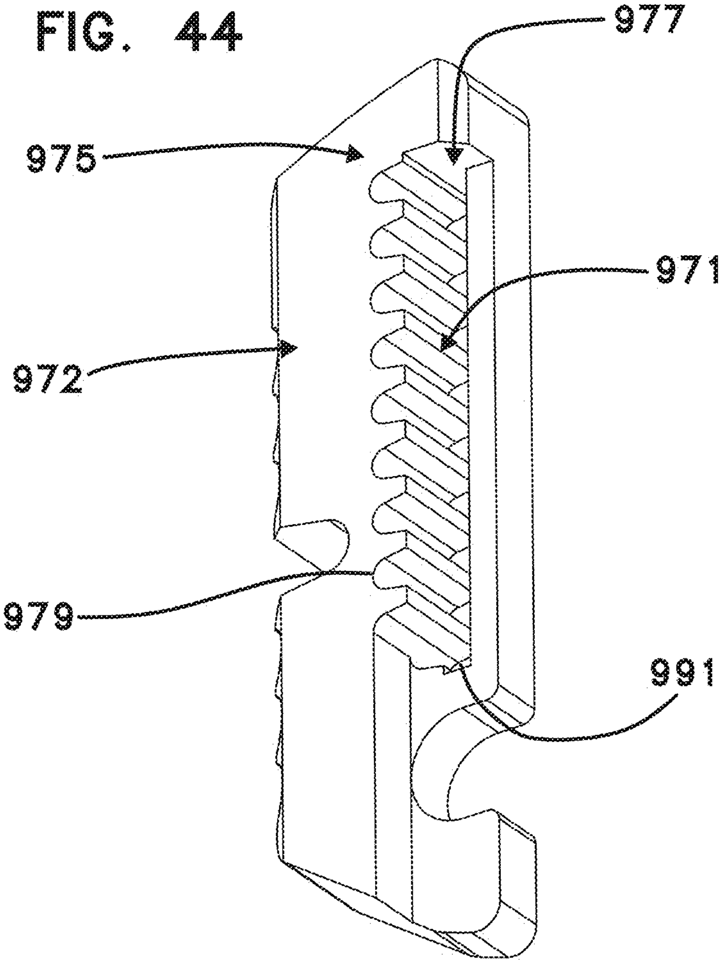
FIG. 44 is a perspective view of another example of a rack according to an embodiment of this disclosure associated with the key follower of FIG. 43.

FIG. 40 shows an end view of the spring-loaded pin 838 and the rack 872 engaged with one another. FIG. 41 shows a cross-sectional view along line D-D in FIG. 40, and FIG. 42 shows a cross-sectional view along line E-E in FIG. 40.

Another example of a pin-rack engagement feature according to an embodiment of the present disclosure is shown in FIGS. 43-49. The pin-rack engagement feature includes a post 931 of a spring-loaded pin 938 engaged with a mating slot 971 of racks 972. Complementary engagement surfaces of the post 931 and the slot 971 engage with one another to block movement of the spring-loaded pin 938 relative to the racks 972. The pin-rack engagement feature shown in FIGS. 43-49 is substantially similar to the pin-rack engagement feature shown in FIGS. 36-42. Specifically, the pin 938 includes the post 931 that has a fin 935 and three projections 933, 934, 936 positioned on the side of the fin 935. Projections 933, 934, 936 are configured to mate with grooves 979 of a first side 975 of the slot 971 of the rack 972. In some examples, the post 931 can include at least two projections. In some examples, the post 931 can include more than three projections. The fin 935 of the post 931 of the pin 938 is configured to be received by a linear aperture 991 of a second side 977 of the slot 971 of the rack 972.

Figure 45:
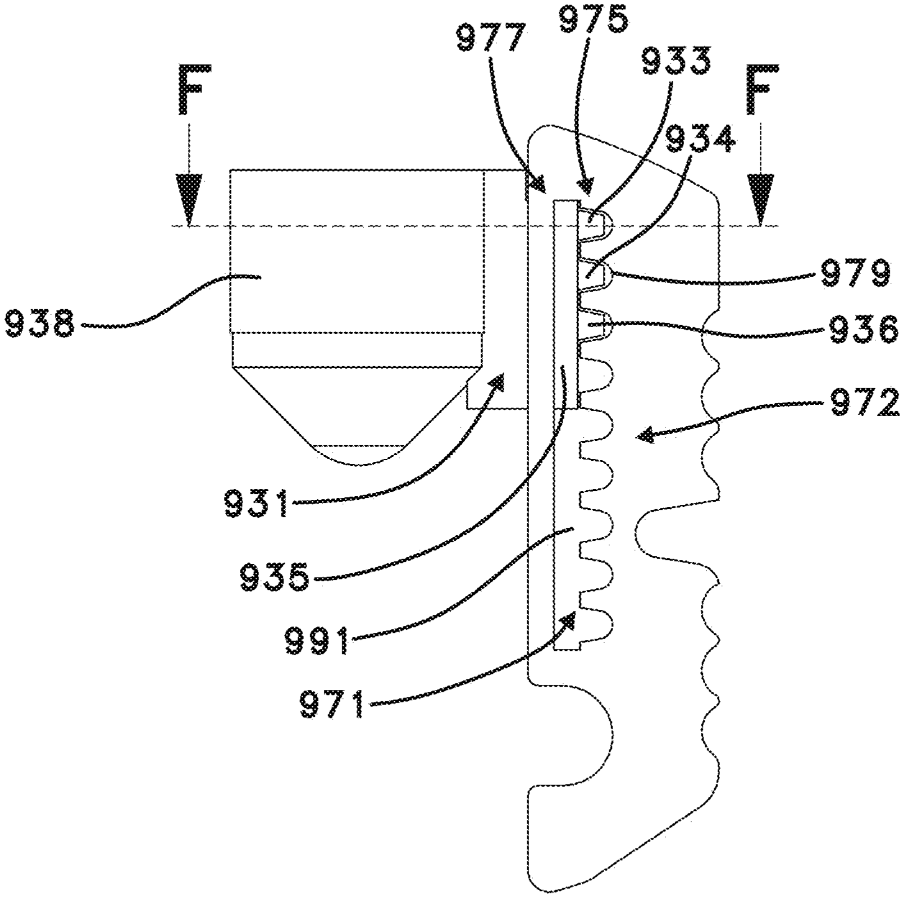
FIG. 45 is a side view of the key follower of FIG. 43 engaged with the rack of FIG. 44.
Figure 46:
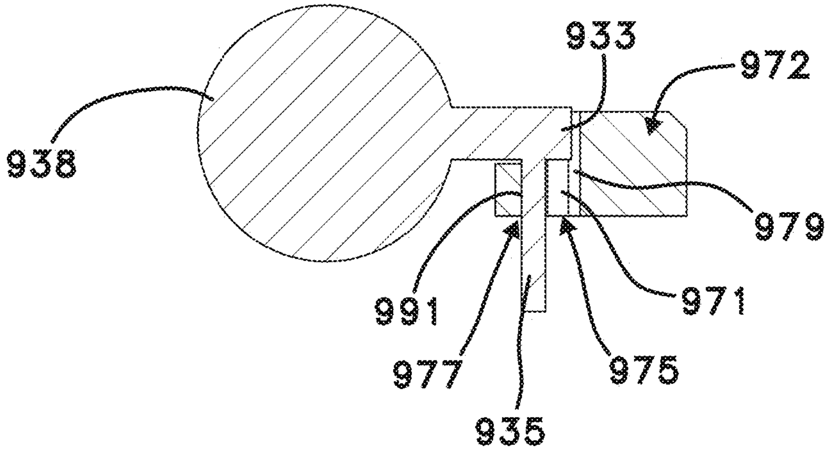
FIG. 46 is a cross-sectional view of the key follower of FIG. 43 engaged with the rack of FIG. 44 along line F-F in FIG. 45.
Figure 47:
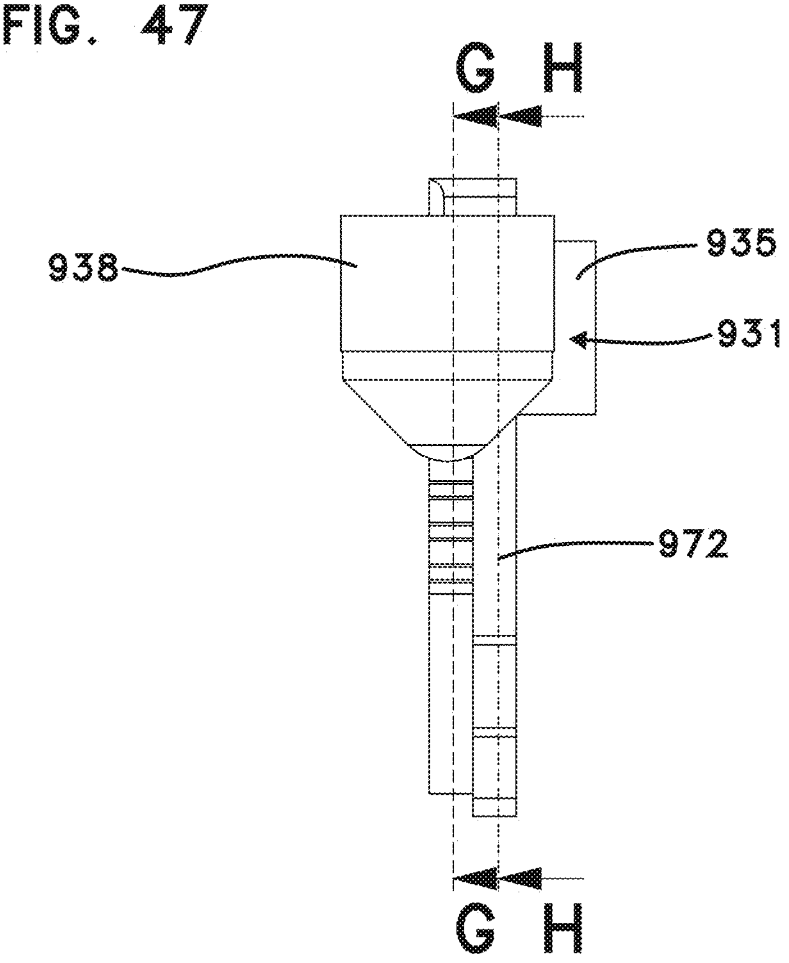
FIG. 47 is a side view of the key follower of FIG. 43 engaged with the rack of FIG. 44.
Figure 48:
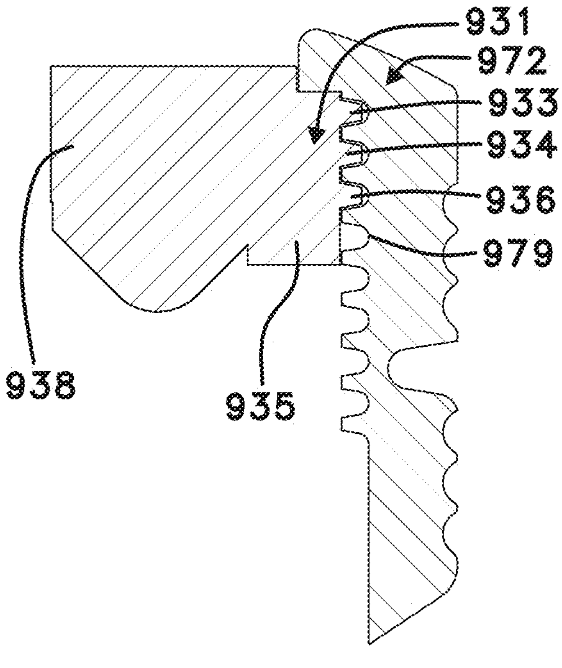
FIG. 48 is a cross-sectional view of the key follower of FIG. 43 engaged with the rack of FIG. 44 along line G-G in FIG. 44.
Figure 49:
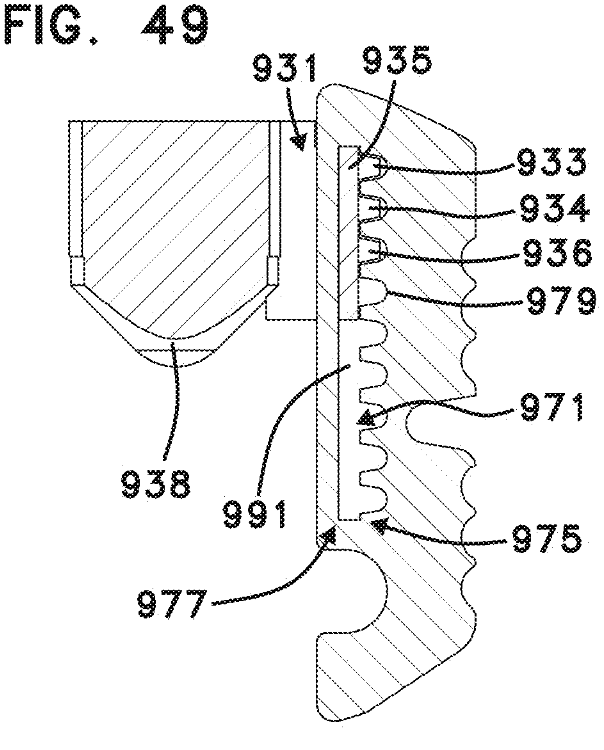
FIG. 49 is a cross-sectional view of the key follower of FIG. 43 engaged with the rack of FIG. 344 along line H-H in FIG. 40.
Figure 50:
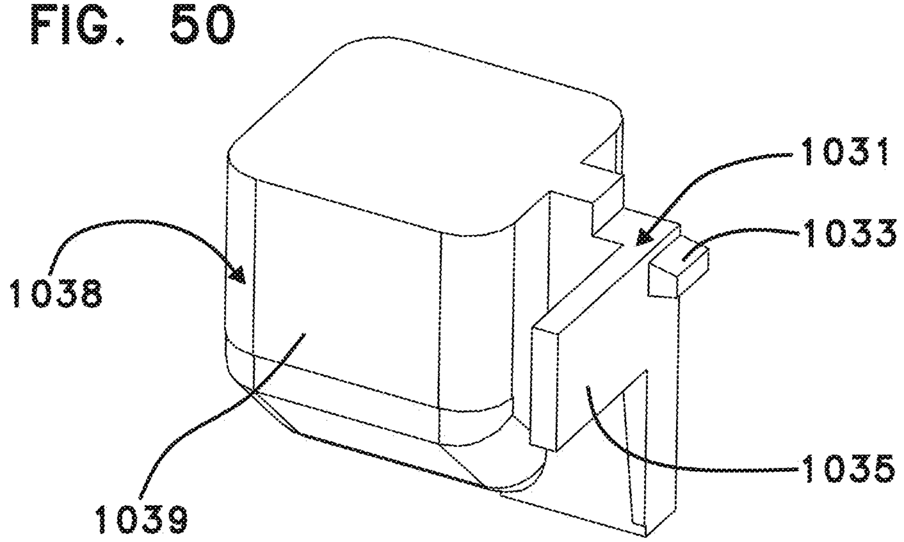
FIG. 50 is a perspective view of another example of a key follower according to an embodiment of this disclosure.
Figure 51:
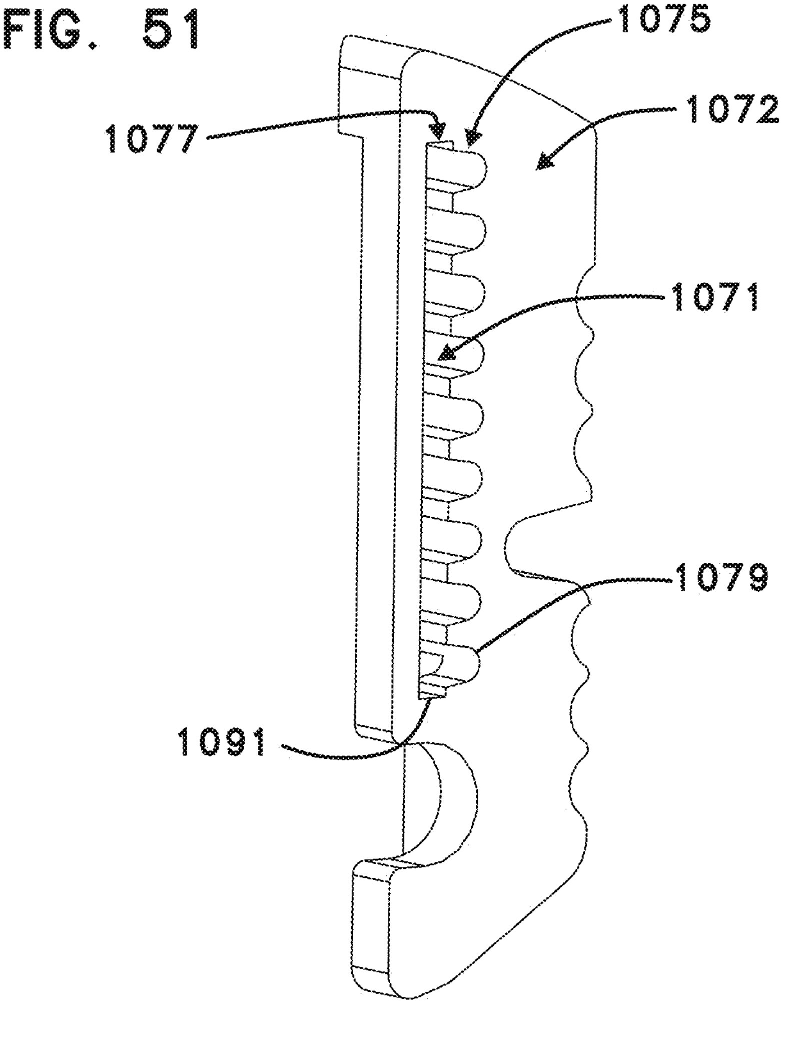
FIG. 51 is a perspective view of another example of a rack according to an embodiment of this disclosure associated with the key follower of FIG. 51.
Figure 52:
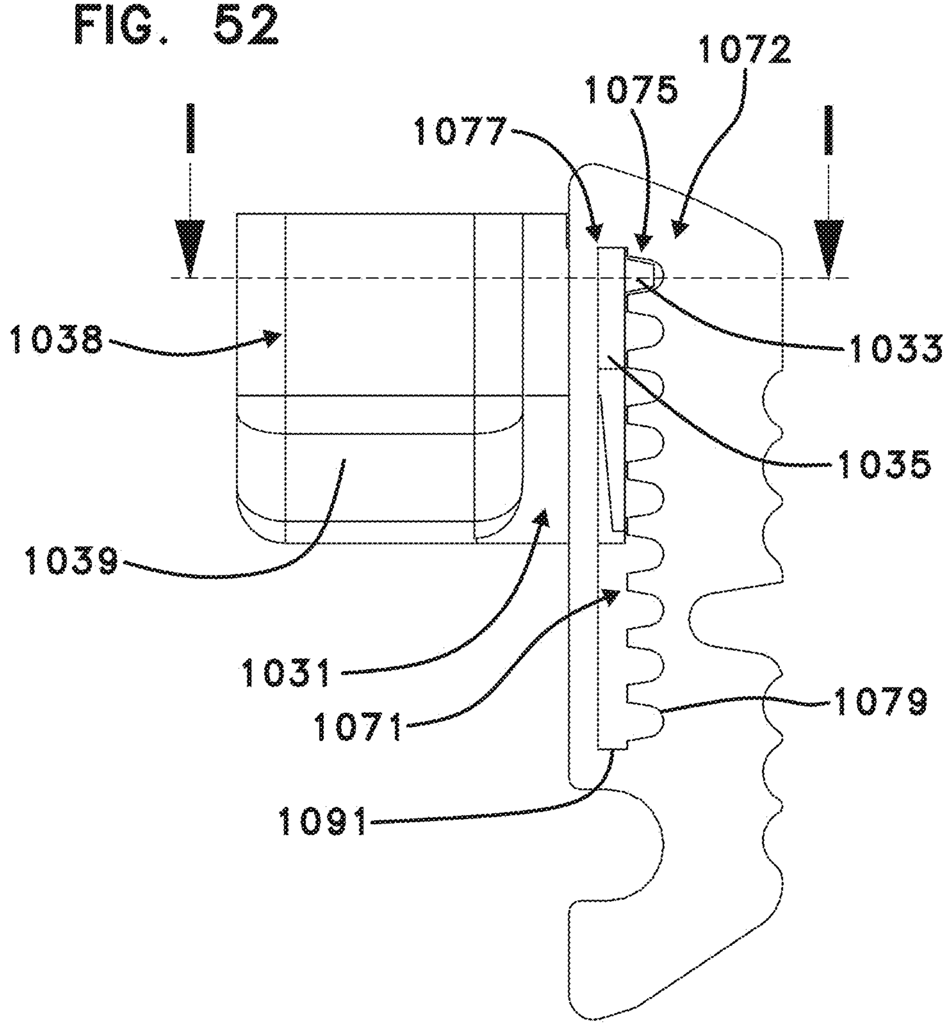
FIG. 52 is a side view of the key follower of FIG. 50 engaged with the rack of FIG. 51.

FIG. 45 shows a side view of the spring-loaded pin 938 and the rack 972 engaged with one another. FIG. 46 shows a cross-sectional view along line F-F in FIG. 45 with the post 931 engaged in the slot 971. FIG. 47 shows an end view of the spring-loaded pin 938 and the rack 972 engaged with one another. FIG. 48 shows a cross-sectional view along line G-G in FIG. 47, and FIG. 49 shows a cross-sectional view along line H-H in FIG. 47.

Figure 53:
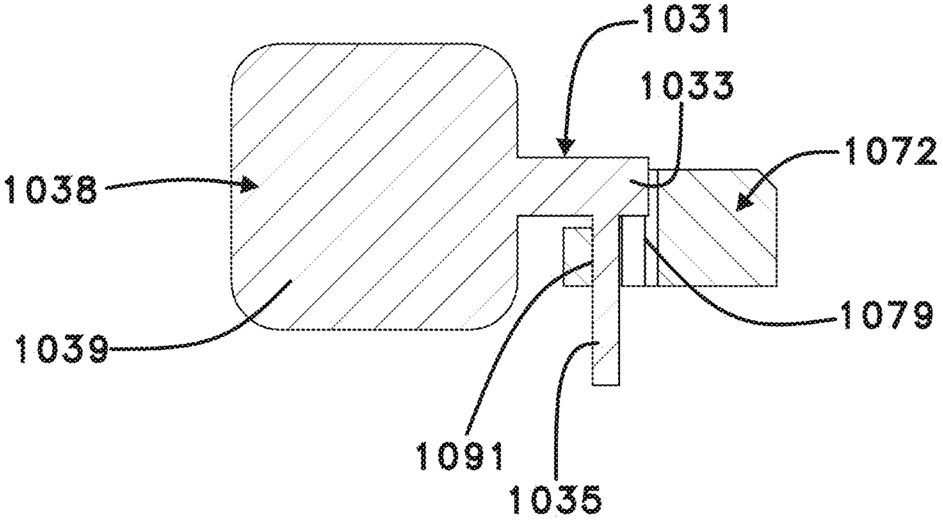
FIG. 53 is a cross-sectional view of the key follower of FIG. 50 engaged with the rack of FIG. 51 along line I-I in FIG. 52.
Figure 54:
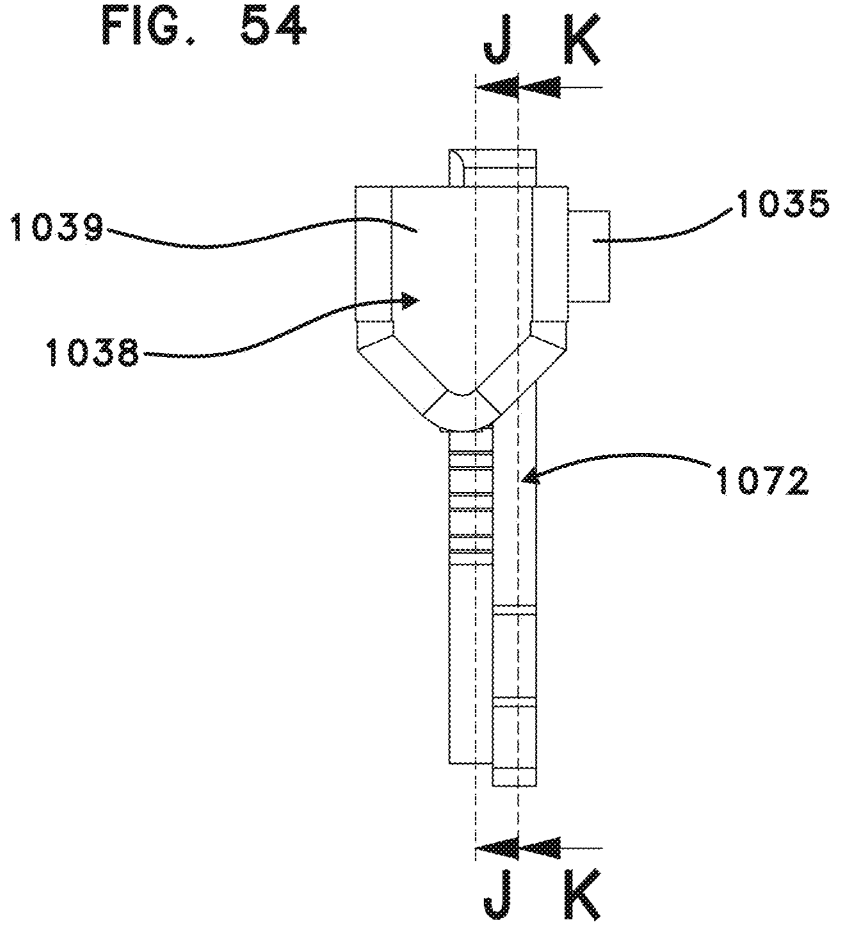
FIG. 54 is a side view of the key follower of FIG. 50 engaged with the rack of FIG. 51.
Figure 55:
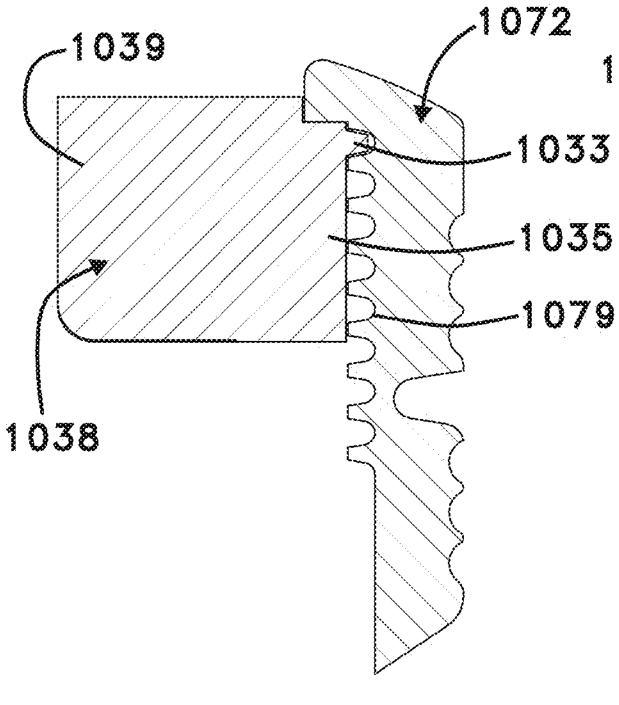
FIG. 55 is a cross-sectional view of the key follower of FIG. 50 engaged with the rack of FIG. 51 along line J-J in FIG. 54.
Figure 56:
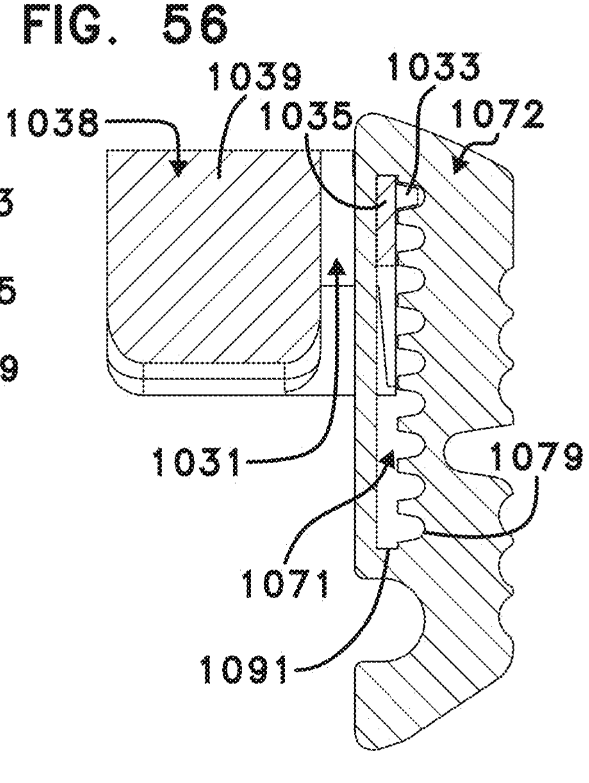
FIG. 56 is a cross-sectional view of the key follower of FIG. 50 engaged with the rack of FIG. 51 along line K-K in FIG. 54.

Another example of a pin-rack engagement feature according to an embodiment of the present disclosure is shown in FIGS. 50-56. FIG. 53 shows a cross-sectional view along line I-I in FIG. 52. FIG. 55 shows a cross-sectional view along line J-J in FIG. 54. FIG. 56 shows a cross-sectional view along line K-K in FIG. 54. The pin-rack engagement feature includes a post 1031 of a spring-loaded pin 1038 engaged with a mating slot 1071 of racks 1072. Complementary engagement surfaces of the post 1031 and the slot 1071 engage with one another to block movement of the spring-loaded pin 1038 relative to the racks 1072. The pin-rack engagement feature shown in FIGS. 50-56 is substantially similar to the pin-rack engagement feature described above. Specifically, the pin 1038 includes the post 1031 that has a fin 1035 and a projection 1033 positioned on a side of the fin 1035. The projection is configured to mate with grooves 1079 of a first side 1075 of the slot 1071 of the rack 1072. In some examples, the post 1031 can include at least two projections. The fin 1035 of the post 1031 of the pin 1038 is configured to be received by a linear aperture 1091 of a second side 1077 of the slot 1071 of the rack 1072.

The pin 1038 includes a main body 1039, from which the post 1031 extends. In some examples, the main body 1039 is configured to be received in a plug body. In some examples, the main body 1039 can receive a spring therein. In the depicted example, the main body 1039 has a rectangular transverse cross section. In some examples, the main body has a circular cross section. It is considered within the scope of the present disclosure, that the main body 1039 can have a variety of different cross sections that match the profile of the recess of the plug assembly in which the pin 1038 is positioned.

Figure 57:
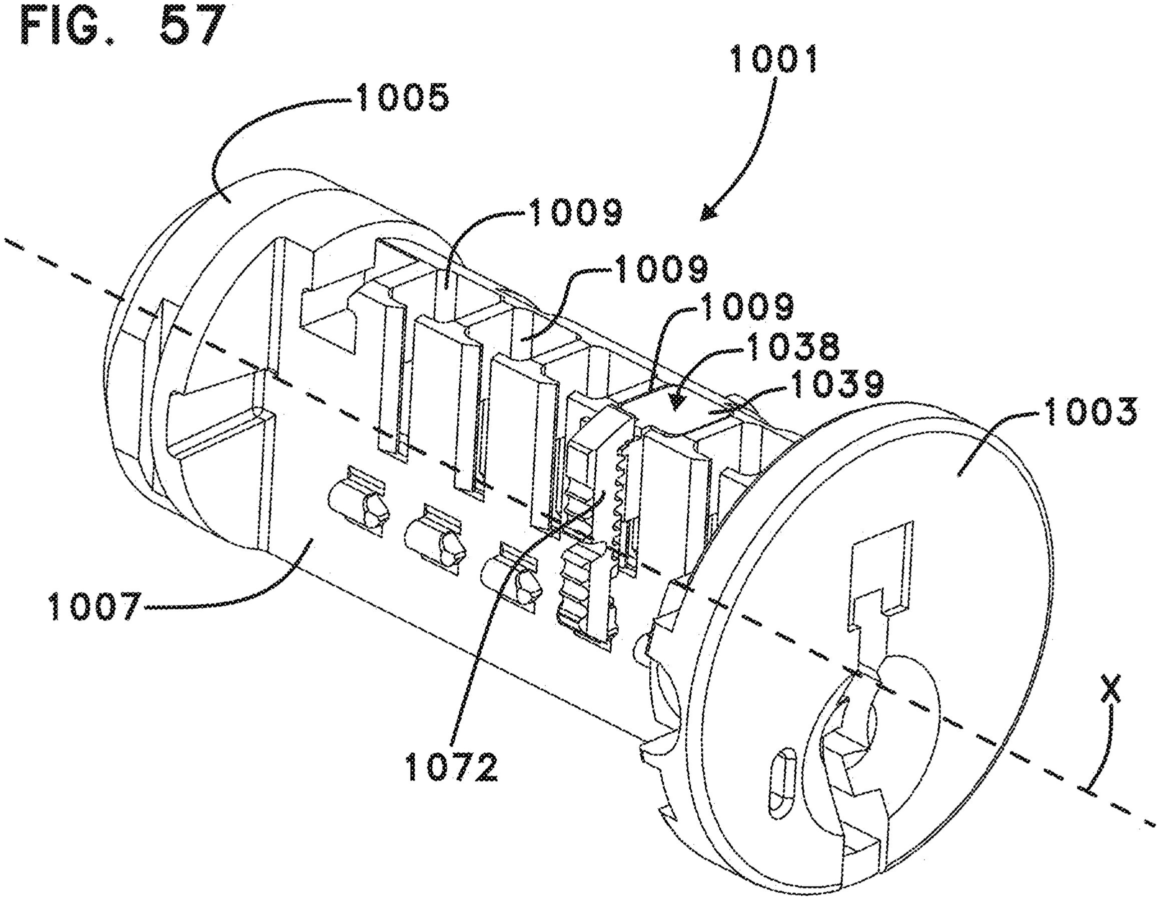
FIG. 57 is a perspective view of the key follower of FIG. 50 engaged and the rack of FIG. 51 and positioned within a plug body.
Figure 58:
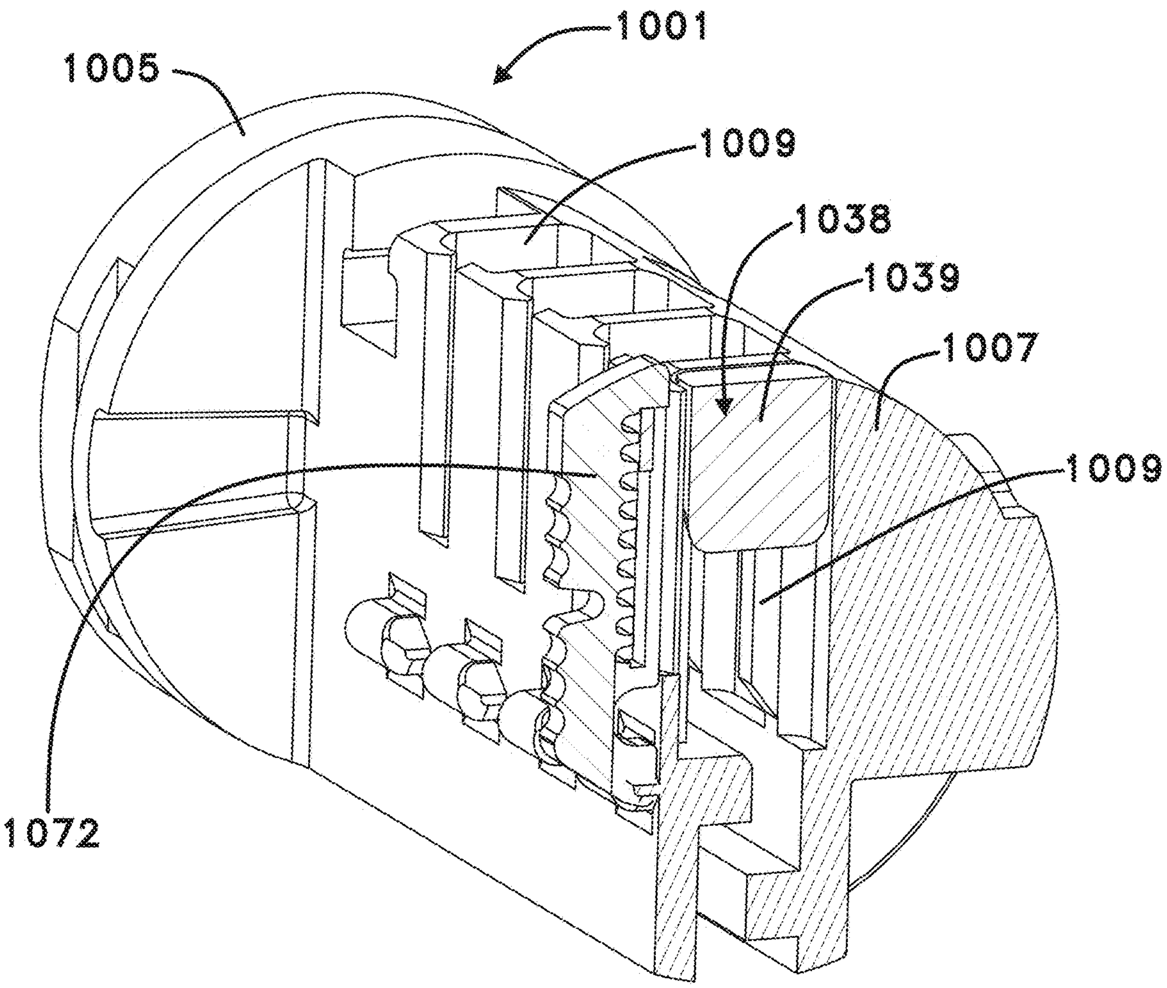
FIG. 58 is a perspective cross sectional view of the plug body, the key follower, and the rack of FIG. 57.
Figure 59:
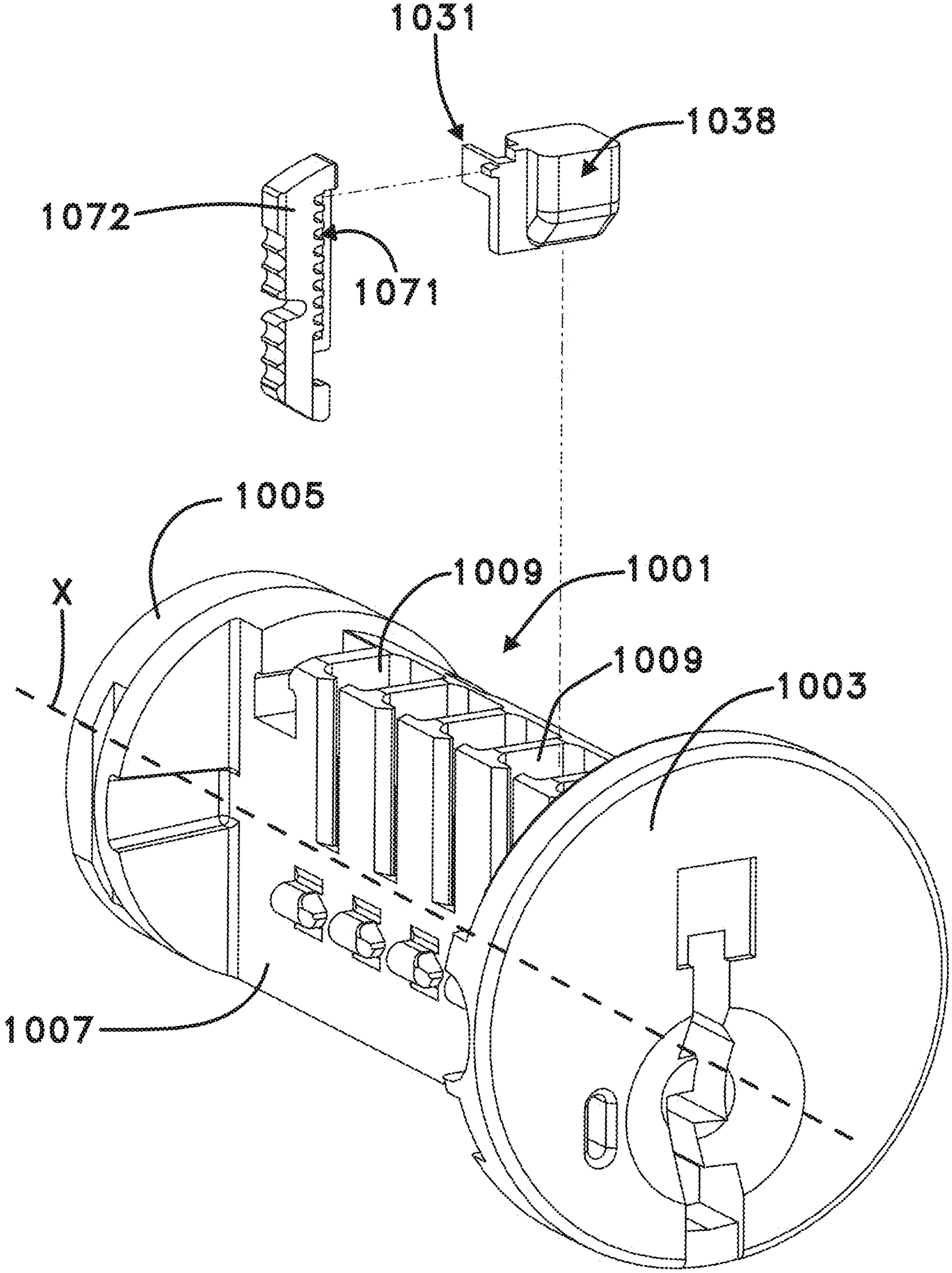
FIG. 59 is a perspective view of the key follower of FIG. 50 and the rack of FIG. 51 both positioned outside of the plug body of FIG. 57.

FIGS. 57 and 58 show a plug body 1001 that has a longitudinal axis X. The plug body 1001 includes a front face 1003, a rear face 1005, and a plug main body 1007 extending between the front and rear faces 1003, 1005. The plug body 1001 further includes a series of key follower recesses 1009 aligned in the plug main body 1007 between the front and rear faces 1003, 1005. As shown in FIGS. 57 and 58, the pin 1038 is coupled to the rack 1072 and the main body 1039 of the pin 1038 is positioned within a key follower recess 1009. FIG. 59 shows the pin 1038 and the rack 1072 removed from the plug body 1001.

Each key follower recess 1009 has an open top and receives a pin 1038 therein. In operation, the pin 1038 moves axially up and down in the recess 1009 as the pin 1038 follows the bitting of a key that is inserted into the plug body 1001.

In the depicted examples, each of the plurality of key followers recesses 1009 has a rectangular cross-section. It is considered within the scope of the present disclosure that each of the key followers recesses 1009 can have a variety of cross sections. In some examples, all of the key follower recesses 1009 have the same cross section. In some examples, all of the key follower recesses 1009 have different cross sections. In some examples, the key follower recesses 1009 each have a cross section that matches that of a pin positioned therein. In some examples, the key follower recesses 1009 each have a cross section that does not match that of a pin positioned therein. In some examples, the key follower recesses 1009 each have cross section that limits rotation of a pin within the key follower recess 1009. In some examples, at least one of the key follower recesses 1009 has a circular cross section and the pin 1038 has a rectangular cross section. In some examples, at least one of the key follower recesses 1009 has a polygonal cross section.

EXAMPLES

Illustrative examples of the lock cylinder disclosed herein are provided below. An embodiment of the lock cylinder may include any one or more, and any combination of, the examples described below.

Example 1 is a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly, with the rack being selectively disengageable from the key follower to facilitate rekeying between different keys. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is formed to define a post and the rack is formed to include a slot extending at least partially through and bounded by the rack. The post is received in the slot such that complementary engagement surfaces of the post and slot engage with one another to block movement of the key follower relative to the rack.

In Example 2, the subject matter of Example 1 is further configured such that the post is formed to define at least a semi-cylindrical outer surface and the slot includes a series of semi-cylindrical grooves. The semi-cylindrical outer surface of the post engages with at least one of the semi-cylindrical grooves of the slot when the post is received in the slot.

In Example 3, the subject matter of Example 2 is further configured such that the post includes a barrel defining the at least one semi-cylindrical surface.

In Example 4, the subject matter of Example 3 is further configured such that the slot further includes a recess for receiving the at least one semi-cylindrical surface.

In Example 5, the subject matter of Example 2 is further configured such that the post includes two barrels defining the at least one semi-cylindrical surface.

In Example 6, the subject matter of Example 5 is further configured such that the barrels are offset from one another in a linear pattern.

In Example 7, the subject matter of Example 2 is further configured such that the post includes three barrels defining the at least one semi-cylindrical surface.

In Example 8, the subject matter of Example 7 is further configured such that the barrels are offset from one another in a triangular pattern.

In Example 9, the subject matter of Example 8 is further configured such that a first series of semi-cylindrical grooves are arranged along a first side of the slot and a second series of semi-cylindrical grooves are arranged along a second side of the slot. The first series of semi-cylindrical grooves is offset from the second series of semi-cylindrical grooves.

Example 10 is a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is engaged with the rack by an engagement feature. The rack is selectively disengageable from the key follower to facilitate rekeying between different keys. The engagement feature allows at least seven different positions of the key follower relative to the rack to allow at least seven different bitting positions in the rekeyable lock cylinder.

In Example 11, the subject matter of Example 10 is further configured such that the engagement feature includes a post and a slot, the post being formed to define at least a semi-cylindrical outer surface. The slot includes a series of semi-cylindrical grooves, and the semi-cylindrical outer surface of the post engages with at least one of the semi-cylindrical grooves of the slot when the post is received in the slot.

In Example 12, the subject matter of Example 10 is further configured such that the post includes two barrels defining the at least semi-cylindrical surface.

In Example 13, the subject matter of Example 12 is further configured such that the barrels are offset from one another in a linear pattern.

In Example 14, the subject matter of Example 11 is further configured such that a first series of semi-cylindrical grooves is arranged along a first side of the slot and a second series of semi-cylindrical grooves is arranged along a second side of the slot, and wherein the first series of semi-cylindrical grooves is offset from the second series of semi-cylindrical grooves.

Example 15 is a rekeyable lock cylinder. The rekeyable lock cylinder includes a cylinder body with a longitudinal axis and is formed to define a groove. The rekeyable lock cylinder includes a plug assembly disposed in the cylinder body and rotatable about the longitudinal axis. The rekeyable lock cylinder includes a locking bar movable between a locked position and an unlocked position. When in the locked position, the locking bar is positioned within the groove of the cylinder body to block rotation of the plug assembly with respect to the cylinder body. When in the unlocked position, the locking bar is spaced apart from the groove of the cylinder body to allow rotation of the plug assembly with respect to the cylinder body. The rekeyable lock cylinder includes a key follower disposed in the plug assembly and the key follower includes a rack engagement feature. The rekeyable lock cylinder includes a rack disposed in the plug assembly and the rack includes a key follower engagement feature. The rack engagement feature of the key follower and the key follower engagement feature of the rack are engaged to facilitate simultaneous movement of the key follower and the rack. The rack controls movement of the locking bar between the locked and unlocked positions. At least one of the rack engagement feature of the key follower and the key follower engagement feature of the rack is a projection and at least one of the rack engagement feature of key follower and the key follower engagement feature of the rack is a slot. The rack is selectively disengageable from the key follower when moving in a direction parallel to the longitudinal axis of the plug assembly.

In Example 16, the subject matter of Example 15 is further configured such that the rack engagement feature of the key follower and the key follower engagement feature of the rack allow at least seven different positions of the key follower relative to the rack.

In Example 17, the subject matter of Example 15 is further configured such that the projection is formed to define at least a semi-cylindrical outer surface. The slot includes a series of semi-cylindrical grooves, and the semi-cylindrical outer surface of the post engages with at least one of the semi-cylindrical grooves of the slot when the post is received in the slot.

In Example 18, the subject matter of Example 17 is further configured such that the projection includes two barrels defining the at least semi-cylindrical surface.

In Example 19, the subject matter of Example 18 is further configured such that the barrels are offset from one another in a linear pattern.

In Example 20, the subject matter of Example 15 is further configured such that a first series of semi-cylindrical grooves is arranged along a first side of the slot of the at least one of the rack engagement feature of the key follower and the key follower engagement feature of the rack, and a second series of semi-cylindrical grooves is arranged along a second side of the slot. The first series of semi-cylindrical grooves is offset from the second series of semi-cylindrical grooves.

Example 21 is a rekeyable lock cylinder with a cylinder body and a plug assembly disposed in the cylinder body. The cylinder body has a longitudinal axis and is formed to define a groove. The plug assembly is rotatable about the longitudinal axis. The rekeyable lock cylinder includes a locking bar movable between a locked position and an unlocked position. When in the locked position, the locking bar is positioned within the groove of the cylinder body to block rotation of the plug assembly with respect to the cylinder body. When in the unlocked position, the locking bar is spaced apart from the groove of the cylinder body to allow rotation of the plug assembly with respect to the cylinder body The rekeyable lock cylinder includes a key follower disposed in the plug assembly. The key follower includes a rack engagement feature that is a post. The rekeyable lock cylinder includes a rack disposed in the plug assembly. The rack includes a key follower engagement feature that is a slot. The rack engagement feature of the key follower and the key follower engagement feature of the rack are engaged to facilitate simultaneous movement of the key follower and the rack.

The rack controls movement of the locking bar between the locked and unlocked positions. The rack is selectively disengageable from the key follower when moving in a direction parallel to the longitudinal axis of the plug assembly. The rekeyable lock cylinder includes the slot of the rack extending at least partially through, and bounded by, the rack. The slot has a first side and a second side that extend parallel with one another along a portion of the length of the rack. The slot has a series of engagement grooves that are arranged along the first side of the slot. The slot also includes a linear aperture arranged along the second side of the slot, immediately adjacent the series of engagement grooves. The post of the key follower has a projection that is engageable with at least one of the series of engagement grooves of the slot when the post is received in the slot. The post of the key follower includes a fin engageable with the linear aperture of the slot when the post is received in the slot.

In Example 22, the subject matter of Example 21 is further configured such that the key follower is disposed within a key follower recess of the plug, and the key follower recess of the plug has a rectangular cross-section.

In Example 23, the subject matter of Example 21 is further configured such that the key follower is disposed within a key follower recess of the plug, and the key follower recess of the plug has a circular cross-section.

In Example 24, the subject matter of Example 21 is further configured such that the post includes at least two projections each defining a profile that matches that of one of the series of engagement grooves of the slot.

In Example 25, the subject matter of Example 21 is further configured such that the rack and the key follower have an interfacing path along which the rack and the key follower engage and disengage with one another. The interfacing path is parallel with the longitudinal axis of the cylinder body and the fin of the post extends in the direction of movement of the rack.

In Example 26, the subject matter of Example 21 is further configured such that the fin of the post extends through and past the linear aperture of the slot when the post is received in the slot.

In Example 27, the subject matter of Example 21 is further configured such that the fin extends further through the slot than the projection when the post is received in the slot.

In Example 28, the subject matter of Example 21 is further configured such that the projection is positioned on the fin.

In Example 29, the subject matter of Example 21 is further configured such that the first side of the slot has a first depth measured parallel to the longitudinal axis of the cylinder body and the second side of the slot having a second depth measured parallel to the longitudinal axis of the cylinder body, the first depth is greater than the second depth.

In Example 30, the subject matter of Example 21 is further configured such that the rack engagement feature of the key follower and the key follower engagement feature of the rack allow at least seven different positions of the key follower relative to the rack.

In Example 31, the subject matter of Example 21 is further configured such that the series of engagement grooves are semi-cylindrical.

In Example 32, the subject matter of Example 21 is further configured such that the linear aperture is partially rectangular.

Example 33 is a rekeyable lock cylinder with a cylinder body and a plug assembly disposed in the cylinder body. The cylinder body has a longitudinal axis and is formed to define a groove. The plug assembly is rotatable about the longitudinal axis. The plug includes a plurality of key follower recesses aligned along the longitudinal axis. The plurality of key follower recesses of the plug assembly each have a rectangular cross-section. The rekeyable lock cylinder includes a plurality of key followers that each have a portion positioned within each of the plurality of key follower recesses of the plug assembly. Each of the plurality of key followers corresponds with a rack and each rack is selectively disengageable from the corresponding key follower to facilitate rekeying between different keys. The portion of each of plurality of key followers positioned within each of the plurality of key follower recesses has a rectangular cross-section. The rekeyable lock cylinder includes a locking bar movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. Each rack controls movement of the locking bar between the locked and unlocked positions. Each of the plurality of key followers is formed to define a post. Each rack is formed to include a slot that extends at least partially through and bounded by the rack. The post is received in the slot such that complementary engagement surfaces of the post and slot engage with one another to block movement of the plurality key followers relative to the racks.

In Example 34, the subject matter of Example 33 is further configured such that the post of the plurality of key followers and the slot of the racks allow at least seven different positions of each key follower relative to each rack.

In Example 35, the subject matter of Example 33 is further configured such that a first side of each slot has a first depth measured parallel to the longitudinal axis of the cylinder body and the second side of each slot has a second depth measured parallel to the longitudinal axis of the cylinder body, wherein the first depth is greater than the second depth.

In Example 36, the subject matter of Example 33 is further configured such that each slot has a first side and a second side extending parallel with one another along a portion of a length of each rack, each slot including: a series of engagement grooves being arranged along the first side of the slot; and a linear aperture arranged along the second side of the slot, immediately adjacent the series of engagement grooves. Each post of the plurality of key followers including: a projection engageable with at least one of the series of engagement grooves of the slot when the post is received in the slot; and a fin engageable with the linear aperture of the slot when the post is received in the slot.

Example 37 is a rekeyable lock cylinder with a cylinder body and a plug assembly disposed in the cylinder body. The cylinder body has a longitudinal axis and is formed to define a groove. The plug assembly is rotatable about the longitudinal axis. The rekeyable lock cylinder includes a key follower and a corresponding rack disposed in the plug assembly. The rack is selectively disengageable from the key follower to facilitate rekeying between different keys. The key follower is formed to define a post having a first projection and a second projection. The first and second projections are vertically aligned within one another and perpendicular to the longitudinal axis of the cylinder body. The first and the second projections have a first length and a second length, respectively. The first and second lengths are parallel to the longitudinal axis of the cylinder body. The first length is greater than the second length. The rekeyable lock cylinder includes a locking bar movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The rack has a plurality of key follower post recesses. The post of the key follower is received in a pair of the plurality of key follower post recesses of the rack to block movement of the key follower relative to the rack.

In Example 38, the subject matter of Example 37 is further configured such that the plurality of key follower post recesses are open at a vertical side adjacent the key follower, the vertical side is perpendicular to the longitudinal axis of the plug assembly.

In Example 39, the subject matter of Example 37 is further configured such that the post of the key follower and the plurality of key follower post recesses of the rack allow at least seven different positions of the key follower relative to the rack.

In Example 40, the subject matter of Example 37 is further configured such that at least one of the first and second projections is wedge-shaped.

In Example 41, the subject matter of Example 37 is further configured such that the key follower is disposed within a key follower recess of the plug assembly, and wherein the key follower recess of the plug assembly has a rectangular cross-section.

In Example 42, the subject matter of Example 37 is further configured such that each of the plurality of key follower post recesses are sized and shaped to receive the first projection or the second projection of the post.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:

a cylinder body defining an interior groove, the cylinder body having a longitudinal axis; and a plug assembly disposed at least partially in the cylinder body and selectively rotatably around the longitudinal axis, the plug assembly including:

a plug body supporting at least one key follower, the at least one key follower having a first rack engagement feature and a second rack engagement feature; and at least one carrier subassembly including:

a locking bar movable between a locked position engaging with the interior groove of the cylinder body for blocking rotation of the plug assembly and an unlocked position spaced apart from the interior groove of the cylinder body to allow rotation of the plug assembly; and at least one rack engaged with the at least one key follower, wherein the at least one rack controls movement of the locking bar between the locked and unlocked positions and the at least one rack is selectively disengageable from the at least one key follower to facilitate rekeying between different keys, and wherein the at least one rack defines a slot that includes a first side and an opposite second side formed from the rack and in open communication, a series of engagement grooves are defined on the first side and configured to engage the first rack engagement feature of the at least one key follower and the second side is linear and configured to engage the second rack engagement feature of the at least one key follower.

2. The rekeyable lock cylinder of claim 1, wherein the first rack engagement feature includes at least one projection and the second rack engagement feature is a fin.

3. The rekeyable lock cylinder of claim 2, wherein the at least one projection is positioned on the fin.

4. The rekeyable lock cylinder of claim 2, wherein the fin extends further through the slot along the longitudinal axis than the at least one projection when engaged in the slot.

5. The rekeyable lock cylinder of claim 2, wherein the fin is rectangular.

6. The rekeyable lock cylinder of claim 1, wherein the plug body includes at least one key follower recess that receives the at least one key follower, the at least one key follower recess and the at least one key follower having rectangular cross-sections.

7. The rekeyable lock cylinder of claim 1, wherein the plug body includes at least one key follower recess that receives the at least one key follower, the at least one key follower recess and the at least one key follower having cylindrical cross-sections.

8. A rekeyable lock cylinder comprising:

a cylinder body defining an interior groove, the cylinder body having a longitudinal axis; and a plug assembly disposed at least partially in the cylinder body and selectively rotatably around the longitudinal axis, the plug assembly including:

a plug body supporting at least one key follower, the at least one key follower having at least one projection and a fin; and at least one carrier subassembly including:

a locking bar movable between a locked position engaging with the interior groove of the cylinder body for blocking rotation of the plug assembly and an unlocked position spaced apart from the interior groove of the cylinder body to allow rotation of the plug assembly; and at least one rack engaged with the at least one key follower, wherein the at least one rack controls movement of the locking bar between the locked and unlocked positions and the at least one rack is selectively disengageable from the at least one key follower to facilitate rekeying between different keys, and wherein the at least one rack defines a slot that includes a first side and an opposite second side formed from the rack and in open communication, the first side includes a first key follower engagement feature configured to engage the at least one projection of the at least one key follower and the second side includes a second key follower engagement feature configured to engage the fin of the at least one key follower.

9. The rekeyable lock cylinder of claim 8, wherein the first side of the slot has a first depth measured parallel to the longitudinal axis and the second side of the slot has a second depth measured parallel to the longitudinal axis, the first depth different than the second depth.

10. The rekeyable lock cylinder of claim 9, wherein the first depth is greater than the second depth.

11. The rekeyable lock cylinder of claim 8, wherein the first key follower engagement feature is a series of engagement grooves and the second key follower engagement feature is a linear aperture.

12. The rekeyable lock cylinder of claim 11, wherein the linear aperture is rectangular.

13. The rekeyable lock cylinder of claim 8, wherein the plug body includes at least one key follower recess that receives the at least one key follower, the at least one key follower recess and the at least one key follower having rectangular cross-sections.

14. The rekeyable lock cylinder of claim 8, wherein the plug body includes at least one key follower recess that receives the at least one key follower, the at least one key follower recess and the at least one key follower having cylindrical cross-sections.

15. A rekeyable lock cylinder comprising:

a cylinder body defining an interior groove, the cylinder body having a longitudinal axis; and a plug assembly disposed at least partially in the cylinder body and selectively rotatably around the longitudinal axis, the plug assembly including:

a plug body supporting at least one key follower, the at least one key follower having a first projection spaced apart from a second projection, the first projection having a first length measured parallel to the longitudinal axis and the second projection having a second length measured parallel to the longitudinal axis, the first length different than the second length; and at least one carrier subassembly including:

a locking bar movable between a locked position engaging with the interior groove of the cylinder body for blocking rotation of the plug assembly and an unlocked position spaced apart from the interior groove of the cylinder body to allow rotation of the plug assembly; and at least one rack engaged with the at least one key follower, wherein the at least one rack controls movement of the locking bar between the locked and unlocked positions and the at least one rack is selectively disengageable from the at least one key follower to facilitate rekeying between different keys, and wherein the at least one rack defines a plurality of key follower recesses configured to engage any one of the first and second projections of the at least one key follower.

16. The rekeyable lock cylinder of claim 15, wherein the first length is greater than the second length.

17. The rekeyable lock cylinder of claim 15, wherein the first projection and the second projection are wedge shaped.

18. The rekeyable lock cylinder of claim 15, wherein the plug body includes at least one key follower recess that receives the at least one key follower, the at least one key follower recess and the at least one key follower having rectangular cross-sections or the at least one key follower recess and the at least one key follower having cylindrical cross-sections.

19. A method of rekeying a rekeyable lock cylinder comprising:

inserting a first key into a keyway opening of the rekeyable lock cylinder that includes a cylinder body and a plug assembly, wherein when the first key is inserted into the keyway opening, the first key positions at least one key follower supported in a plug body of the plug assembly so that at least one rack supported in a carrier subassembly and engaged to the at least one key follower moves a locking bar towards an unlocked position and spaced apart from an interior groove defined in the cylinder body;

rotating the plug assembly around a longitudinal axis of the rekeyable lock cylinder with the first key relative to the cylinder body when the locking bar is in the unlocked position;

moving a carrier of the carrier subassembly that supports the at least one rack axially along the longitudinal axis and relative to the plug body so that the at least one rack disengages the at least one key follower;

removing the first key from the keyway opening;

inserting a different second key into the keyway opening; and rotating the plug assembly around the longitudinal axis so that the carrier axially returns along the longitudinal axis and the at least one rack engages with the at least one key follower at a location corresponding to the second key, wherein the at least one rack includes a first key follower engagement feature and a second key follower engagement feature, and the at least one key follower includes a first rack engagement feature and a second rack engagement feature, and wherein the at least one key follower and the at least one rack have an interfacing path for engagement, the first key follower engagement feature interfacing with the first rack engagement feature prior to the second key follower engagement feature interfacing with the second rack engagement feature along the interfacing path during engagement.

20. The method of claim 19, wherein the interfacing path is parallel to the longitudinal axis.

* * * * *